United States Patent
Leiber

(10) Patent No.: US 12,384,347 B2
(45) Date of Patent: Aug. 12, 2025

(54) BRAKE DEVICE, IN PARTICULAR FOR ELECTRICALLY DRIVEN MOTOR VEHICLES

(71) Applicant: IPGATE AG, Pfäffikon (CH)

(72) Inventor: Thomas Leiber, Rogoznica (HR)

(73) Assignee: IPGATE AG, Pfäffikon (CH)

( * ) Notice: Subject to any disclaimer, the term of this patent is extended or adjusted under 35 U.S.C. 154(b) by 641 days.

(21) Appl. No.: 17/638,255

(22) PCT Filed: Aug. 20, 2020

(86) PCT No.: PCT/EP2020/073327
§ 371 (c)(1),
(2) Date: Feb. 25, 2022

(87) PCT Pub. No.: WO2021/037664
PCT Pub. Date: Mar. 4, 2021

(65) Prior Publication Data
US 2022/0289161 A1 Sep. 15, 2022

(30) Foreign Application Priority Data

Aug. 30, 2019 (DE) .................. 10 2019 123 343.7

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 8/4081* (2013.01);
(Continued)

(58) Field of Classification Search
CPC ...... B60T 13/745; B60T 7/042; B60T 13/686; B60T 8/4081; B60T 13/146;
(Continued)

(56) References Cited

U.S. PATENT DOCUMENTS 9,541,102 B2   1/2017  Leiber
9,586,486 B2 * 3/2017  Kunz .................... B60T 8/4072
(Continued)

FOREIGN PATENT DOCUMENTS

CN   104149764 A   11/2014
CN   107428325 A   12/2017
(Continued)

OTHER PUBLICATIONS

WO document No. 2019002475 to Leiber published on Jan. 3, 2019.*

(Continued)

*Primary Examiner* — Pamela Rodriguez
(74) *Attorney, Agent, or Firm* — Panitch Schwarze Belisario & Nadel LLP

(57) ABSTRACT

A brake device for a motor vehicle with two axles in which at least one axle has an electric traction motor for driving and braking at least one wheel arranged on an axle, and in which energy can be recovered via the traction motor during braking, each wheel having a wheel brake. The brake device includes a pressure supply having an electric motor-driven pump in the form of a piston-cylinder unit or a rotary pump, which can both build up pressure and reduce pressure, and which is part of a pressure supply device. An open-loop and closed-loop control device controls the traction motor and components of the pressure supply device such that a braking deceleration can be set by closed-loop control individually for each brake circuit, each axle or wheel brakes of an axle, with different braking torques at the respective axles or wheel brakes of an axle.

13 Claims, 17 Drawing Sheets

(51) Int. Cl.
  *B60T 8/40* (2006.01)
  *B60T 13/14* (2006.01)
  *B60T 13/68* (2006.01)

(52) U.S. Cl.
  CPC .......... *B60T 13/146* (2013.01); *B60T 13/686* (2013.01); *B60T 2270/402* (2013.01); *B60T 2270/403* (2013.01); *B60T 2270/404* (2013.01); *B60T 2270/82* (2013.01); *B60Y 2400/81* (2013.01)

(58) Field of Classification Search
  CPC .......... B60T 2270/82; B60T 2270/404; B60T 2270/403; B60T 2270/402; B60T 1/10; B60Y 2400/81; B60L 7/10; F16D 61/00
  See application file for complete search history.

(56) References Cited

U.S. PATENT DOCUMENTS

| | | | |
|---|---|---|---|
| 9,981,645 | B2 | 5/2018 | Kim et al. |
| 11,097,708 | B2* | 8/2021 | Leiber .................. B60T 7/042 |
| 2010/0225159 | A1 | 9/2010 | Drumm |
| 2014/0333123 | A1 | 11/2014 | Kunz et al. |
| 2018/0215366 | A1 | 8/2018 | Leiber et al. |
| 2022/0041150 | A1* | 2/2022 | Leiber ...................... B60T 8/94 |
| 2022/0055592 | A1* | 2/2022 | Leiber ...................... B60T 13/00 |
| 2022/0314813 | A1* | 10/2022 | Koglsperger ......... B60T 13/146 |

FOREIGN PATENT DOCUMENTS

| | | |
|---|---|---|
| DE | 102013224313 A1 | 9/2014 |
| DE | 102013208703 A1 | 11/2014 |
| DE | 202015008975 U1 | 6/2016 |
| DE | 102005055751 B4 | 9/2018 |
| DE | 102005018649 B4 | 10/2018 |
| DE | 102005063659 B3 | 6/2019 |
| EP | 1874602 B1 | 12/2012 |
| EP | 1907253 B1 | 7/2013 |
| JP | H05270387 A | 10/1993 |
| WO | 2006111393 A1 | 10/2006 |
| WO | 2010037519 A2 | 4/2010 |
| WO | 2012059175 A1 | 5/2012 |
| WO | 2018130406 A1 | 7/2018 |
| WO | 2018215397 A1 | 11/2018 |
| WO | 2018233854 A1 | 12/2018 |
| WO | 2018233923 A1 | 12/2018 |

OTHER PUBLICATIONS

Translation of WO document No. WO 2018/233923 to Leiber published on Dec. 27, 2018.*
Translation of DE 202015008975 to Ipgate published on Jul. 21, 2016.*
Office Action issued Jun. 19, 2023 in EP Application No. 20760807.6.
Office Action issued Feb. 24, 2022 in German Application No. 102019123343.7 (no translation, shown for relevance).
Office Action issued on Feb. 28, 2025, in CN Application No. 202080061333.9.

* cited by examiner

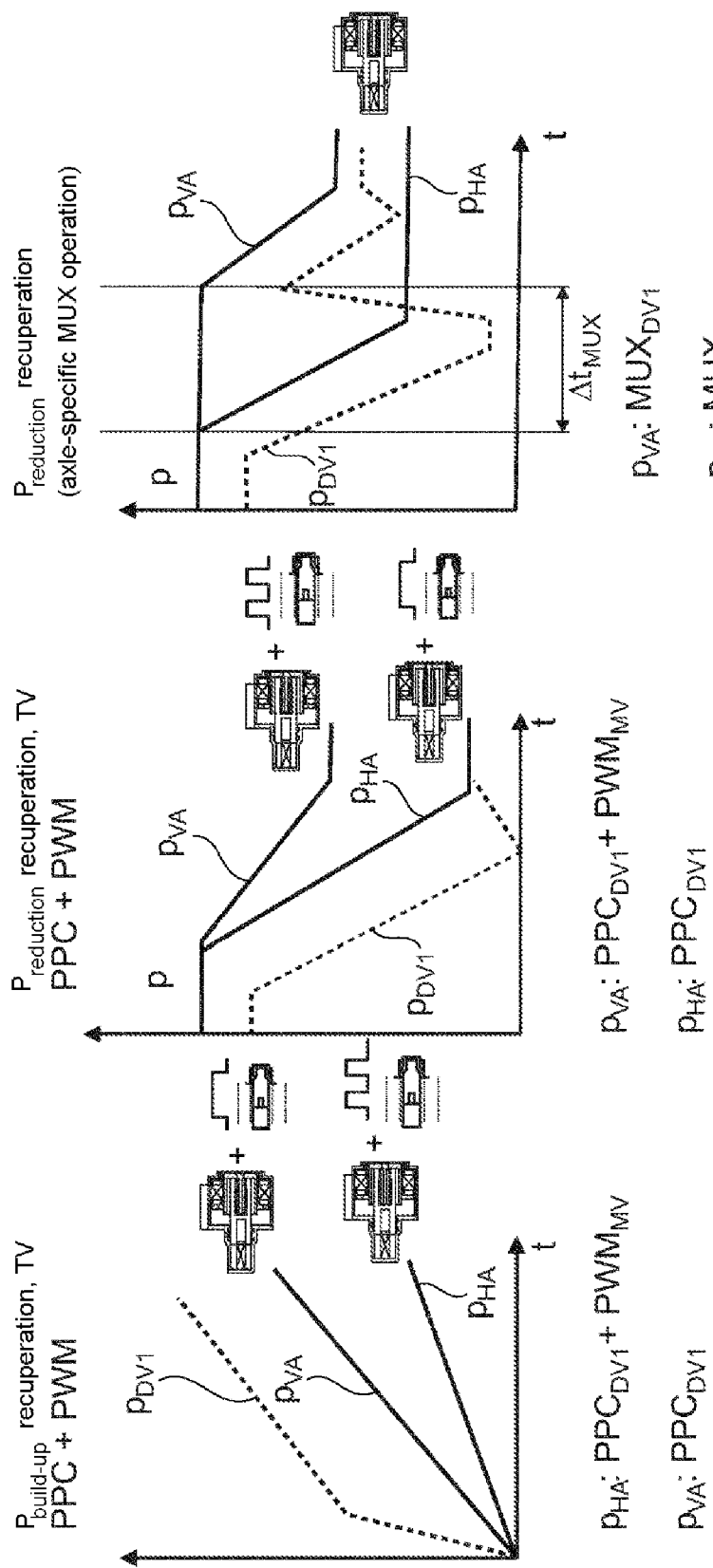

Figure 1:
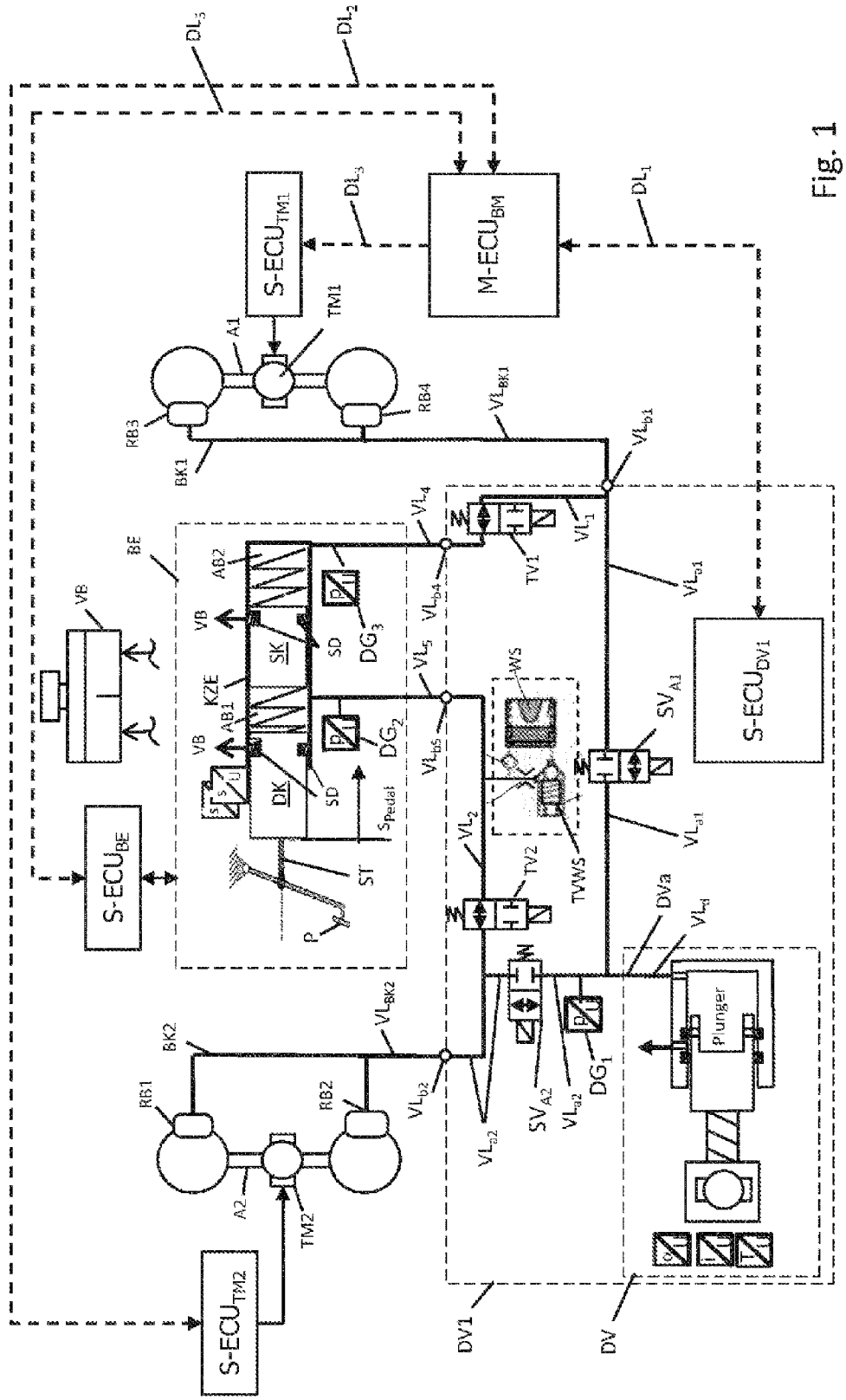
Figure 1A:
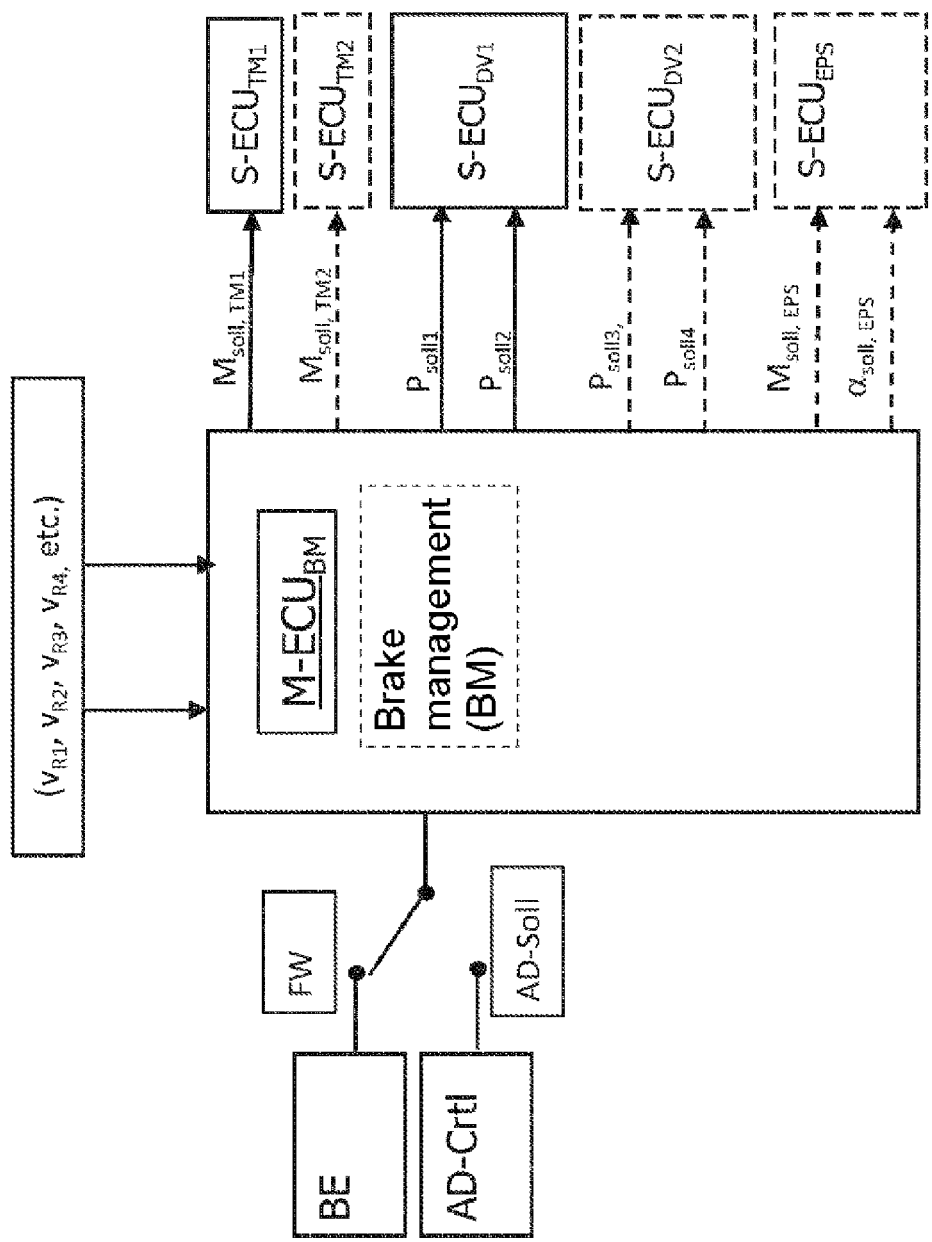
Figure 1B:
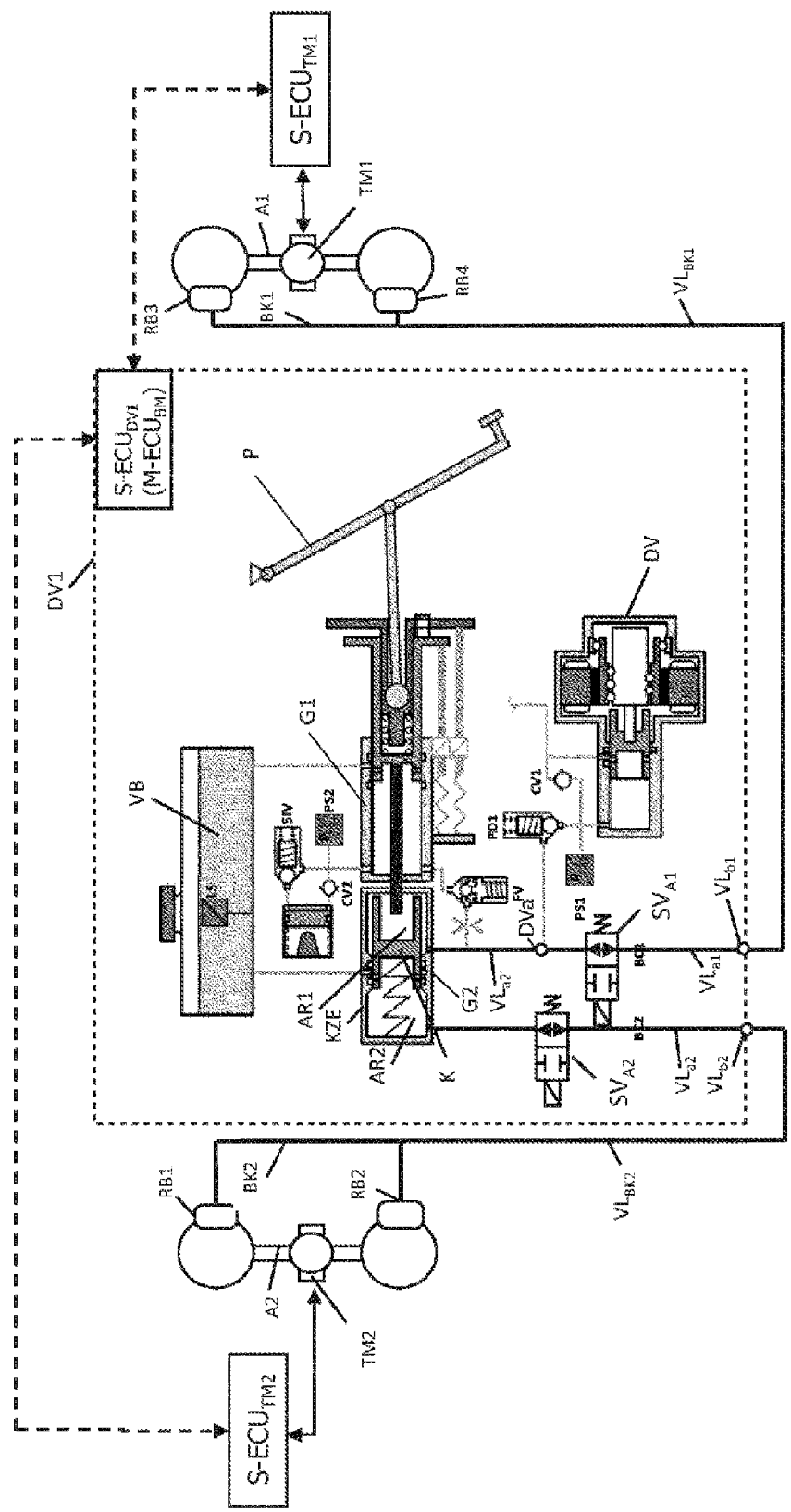
Figure 1C:
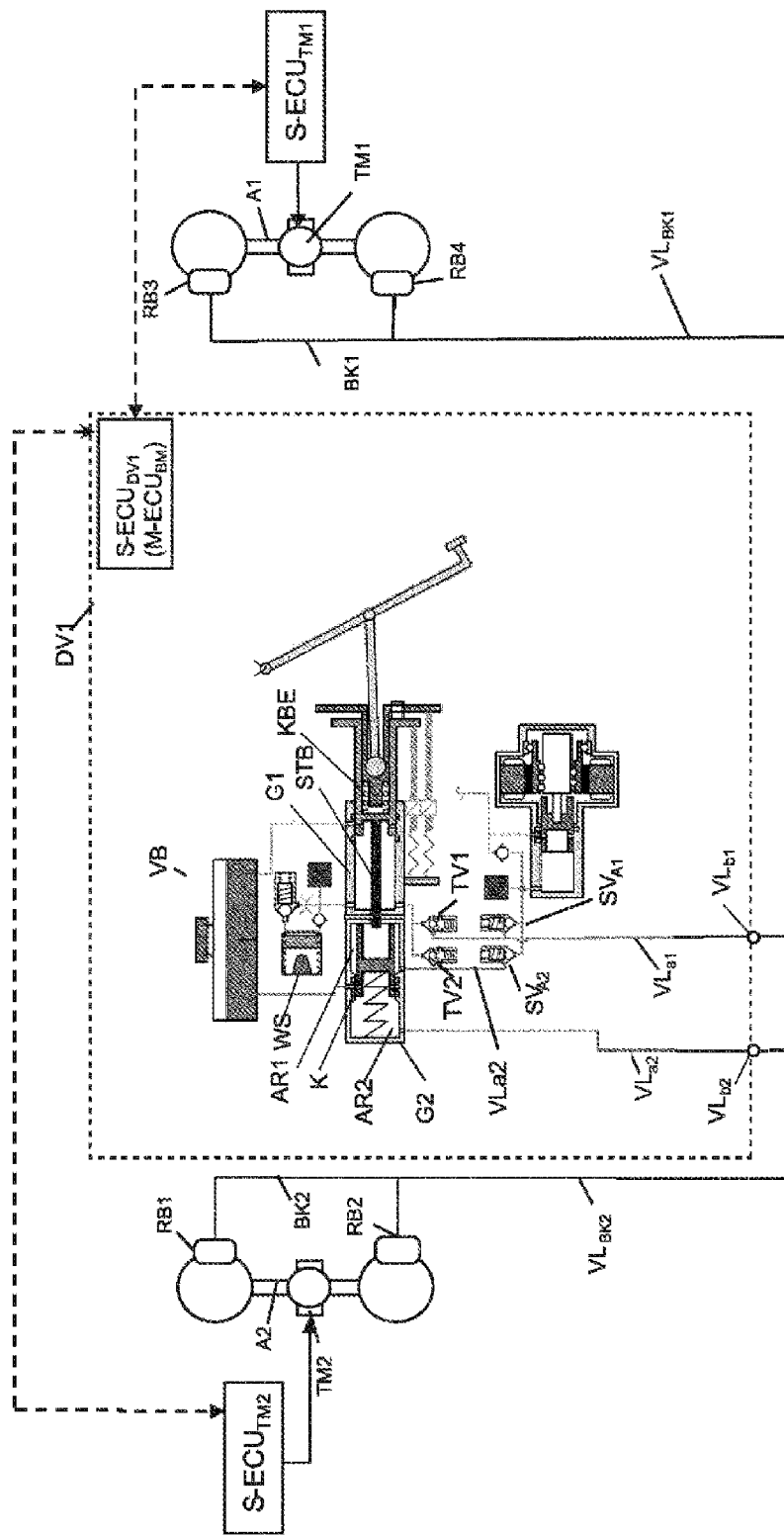

(Hydraulic diagram Fig. 1b, 1c)

Figure 5:
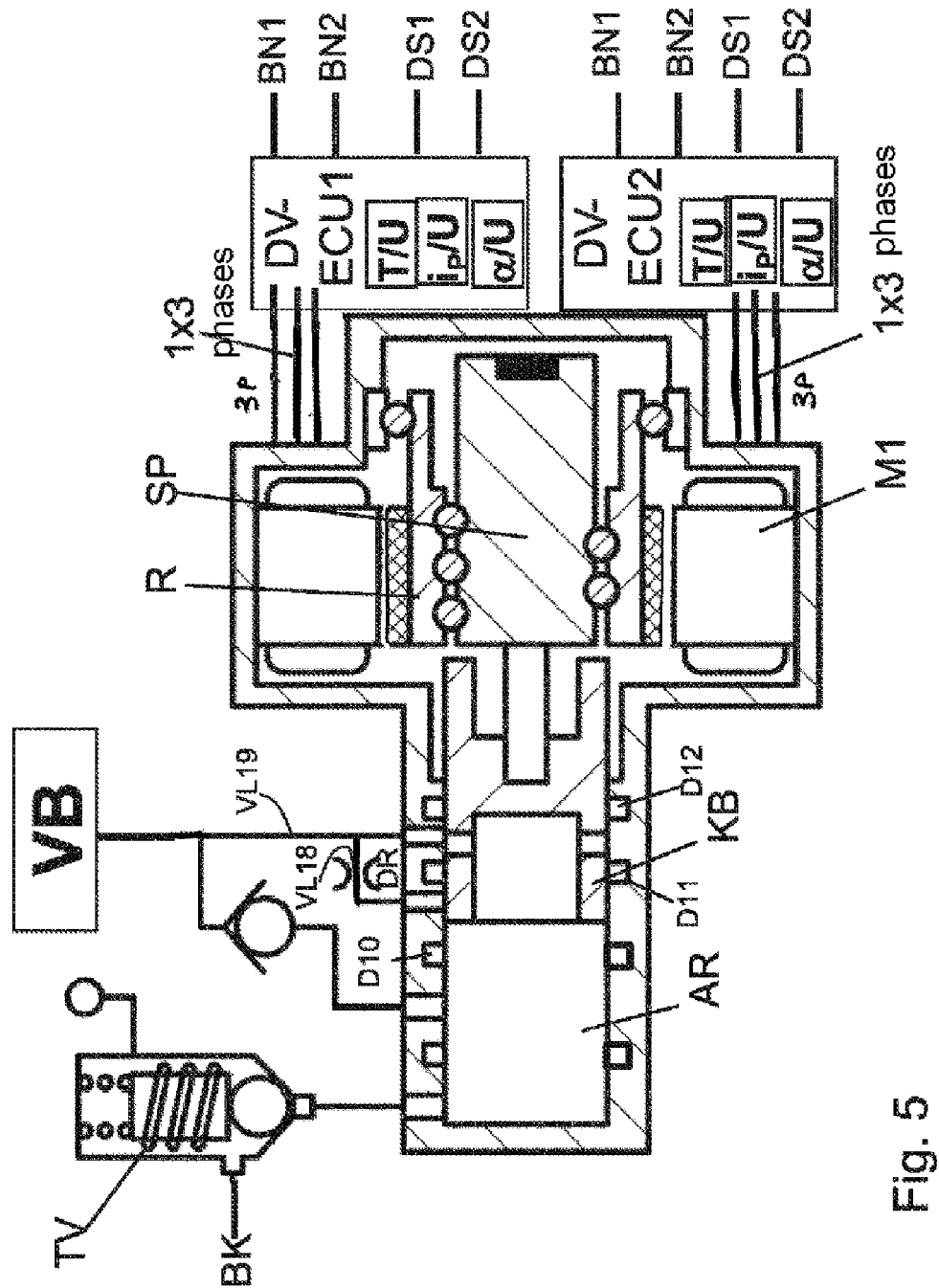

(Hydraulic diagram Fig. 5)

(Hydraulic diagram Fig. 3c)

(Hydraulic diagram Fig. 3c)

BRAKE DEVICE, IN PARTICULAR FOR ELECTRICALLY DRIVEN MOTOR VEHICLES

CROSS-REFERENCE TO RELATED APPLICATION

This application is a Section 371 of International Application No. PCT/EP2020/073327, filed Aug. 20, 2020, which was published in the German language on Mar. 4, 2021 under International Publication No. WO 2021/037664 A1, which claims priority under 35 U.S.C. § 119 (b) to German Patent Application No. 10 2019 123 343.7, filed Aug. 30, 2019, the disclosures of which are incorporated herein by reference.

The present invention relates to a brake device for a motor vehicle with two axles, wherein at least one axle has an electric traction motor for driving and braking the at least one wheel arranged on the axle, and energy can be recovered by means of the traction motor during braking, each wheel has a wheel brake, a pressure supply is provided, having a pump which is driven by an electric motor and which is in the form of a piston-cylinder unit or a rotary pump, the pressure supply can both build up pressure and reduce pressure, in particular by forward and backward movement of the piston of the piston-cylinder unit or reversal of the direction of rotation of the rotary pump, and has at least one pressure supply outlet.

PRIOR ART

WO2018215397A1 discloses a brake system for recuperating kinetic energy by means of the electric drive motor at a first axle, wherein the second axle is connected to the actuating unit. Furthermore, WO2018215397A1 discloses a recuperation braking management system with an electric motor and a brake system at one axle.

PPC pressure control systems with electrically driven piston-cylinder systems using pressure-volume characteristic curve, current and piston position are known for example from EP 1874602 B1, DE 102005055751 B3, DE 102005018649 B3, DE 102005063659 B3 and EP 1907253 B1, and multiplex pressure control is known from EP 1874602 B1 and DE 102005055751 B3.

For example, DE 102005055751 B3 discloses a brake system in which the pressure change in the wheel brakes is implemented using a pressure-volume characteristic curve, wherein the piston control is performed by means of motor current measurement and/or determination of the piston position (so-called PPC pressure control), wherein each wheel brake is assigned a switching valve and, during the pressure change, the switching valve assigned to the wheel brake is permanently open. To maintain the pressure in the respective wheel brake, the respective switching valve is closed.

DE 102005018649 B3 also discloses that, for the pressure control, a characteristic map is used which is adapted during operation. The purpose of the adaptation is to detect changes during operation, such as changes in the pressure-volume characteristic curve, owing to air inclusions in the hydraulic medium of the brake system.

DE 102005063659 B3 discloses pressure control by current control and booster characteristic curve. In the case of current control, the linear relationship between motor current (phase current) and motor torque, the so-called torque constant, is used in the pressure control and/or diagnosis if no pressure transducer is available as a measurement signal.

EP1907253B1 discloses a brake system with an actuating device, in particular in the form of a brake pedal, wherein the brake system has an open-loop and closed-loop control device which controls an electromotive drive device on the basis of the movement and/or position of the actuating device, wherein the drive device adjusts a piston of a piston-cylinder system, via a non-hydraulic transmission device that is fixedly coupled to the piston, such that a pressure is set in the working chamber of the cylinder, wherein the working chamber is connected to a wheel brake via a pressure line. A valve controlled by the open-loop and closed-loop control device is arranged in the pressure line to each wheel brake, wherein, in the event of failure of the drive device, the actuating device adjusts the piston or the drive device. Here, the electromotive drive device adjusts the piston via a rotor and a spindle drive that acts as a reduction transmission, such that the piston generates the pressure change required for the brake force boosting and the anti-lock brake system (ABS). The valve closes after the required brake pressure has been reached in the brake cylinder, and is also open during ABS operation both to set a new lower and a new higher brake pressure.

OBJECT OF THE INVENTION

To provide a brake system which is of simple, fail-safe and inexpensive construction and can be used for driving dynamics systems with central control of a vehicle for braking interventions in two brake circuits together, with recuperation of kinetic energy by means of electric motors in electric axle drives, and which can optionally be expanded to incorporate steering systems.

This object may be achieved by means of a brake system having features as set forth in the accompanying claims.

The brake system according to the invention is advantageously characterized in that it has a central brake management system with a central open-loop and closed-loop control device (M-ECU$_{BM}$) and slave open-loop and closed-loop control devices (E-ECU$_i$) for the electric axle drive motors (TM1, TM2) and electrically driven pressure supply devices (DV1, DV2), such that, at multiple axles or multiple wheel brakes of one axle, setpoint braking torques can be specified for the electric traction motor(s) and for the hydraulic wheel brakes and thus for the pressure supply device. Here, the central brake management system may be arranged in an open-loop and closed-loop control device (M-ECU$_{BM}$) that is separate from the pressure supply device, or else the open-loop and closed-loop control unit (S-ECU$_{DV1}$) of the pressure supply device contains or forms the central brake management system. The central brake management system may be a software module of a central driving dynamics control system in accordance with the domain structure of modern electrically driven vehicles.

The brake system according to the invention can perform brake-circuit-specific control of the brake pressures and can also additionally use an electric drive motor, which is also referred to below as an electric traction motor, or multiple electric drive motors, which is/are arranged at the front axle and/or rear axle of a motor vehicle, to generate a deceleration torque and in so doing simultaneously convert kinetic energy into electrical energy by braking by means of the traction motor(s), and thus recover said electrical energy (recuperation).

Here, the brake system according to the invention may advantageously be configured such that, in an embodiment A, a braking deceleration can be set by closed-loop control on an axle-specific basis by means of the at least one traction motor and the pressure supply device in interaction for each axle, or, in an embodiment B, a braking deceleration can be set by closed-loop control on a wheel-specific basis in interaction with two wheel brakes of an axle.

In embodiment A (2-channel braking force control), axle-specific control in the context of the electrical braking force distribution (EBV) or simplified axle-specific ABS for 4-wheeled vehicles, or ABS function for 2-wheeled vehicles, is combined with the recuperation using at least one electric motor.

In embodiment B (2×2-channel braking force control), the wheel-specific deceleration of an axle is combined with the recuperation of an electric drive motor of the axle, wherein torque vectoring, steering and ABS/ESP functions in the axle can be implemented in addition to embodiment A. It is thus additionally also possible for an electric power steering system at the axle, and control of the steering system by means of the central management system, to be jointly integrated, and the steering function of the brake system by yaw moment control is used in embodiment B as redundancy for the electric power steering system, or to improve agility. Thus, in the event of failure of the electric power steering system during operation, driving stability can be maintained by means of the brake. Furthermore, both the power steering system and the brake system can be used to intervene in the driving dynamics in order to improve agility, in particular in vehicles with very high performance or agility requirements, for example steering at the front axle by means of the electric power steering system and simultaneous torque vectoring interventions at the rear axle of a vehicle. In the second embodiment B, one or more drive motors of an axle, for example axle drive using one or two motors, steering systems at the front axle and optionally also the rear axle, and wheel hub electric motors at each wheel, can be provided, and the same or different solutions can be combined at different axles. A respective 2-channel control module is preferably provided for each axle for a black/white braking force distribution, with the advantages of short hydraulic lines between the pressure supply and the brake. This embodiment is predestined for electric axles. If a diagonal braking force distribution is imperative, each 2-channel control module can also provide wheel brakes in each case at the front axle and at the rear axle in a typical diagonal braking force distribution, with the disadvantage that hydraulic lines have to be routed through the vehicle.

In both embodiments, the pressure in the closed brake circuit is set, or set by closed-loop control, by means of the pressure supply device using the PPC method, and during closed-loop control operation, that is to say different wheel pressures in the brake circuits, in accordance with the disclosure of EP1907253B1, the pressure in the brake circuits is set, or set by closed-loop control, simultaneously, in a time-offset manner, in particular using the multiplex method, or partially simultaneously, that is to say with a time overlap. For this purpose, the brake system according to the invention has two connecting lines, which connect the pressure supply to the two brake circuits, wherein, in each connecting line, there is arranged a switching valve for selectively closing and opening the respective connecting line. For safety reasons, the switching valves may preferably be designed such that the respective hydraulic outlet at the ball valve seat of the switching valves is connected to the wheel brake via a hydraulic line, such that, in the event of a fault, the pressure in the wheel brake automatically opens the solenoid valves and the brake pressure can always be safely reduced in the event of a fault. The switching valve may be permanently open for the duration of the pressure change in the associated brake circuit, wherein the pressure change is then performed with the pressure supply of the pressure supply device.

In addition or as an alternative to the multiplex control, the pressure supply may also provide a pressure through a combination of the PPC method with PWM control or current control of the switching valves. As a result, the pressure in one brake circuit is controlled in closed-loop or open-loop fashion by admission pressure control by means of the pressure supply using the PPC method with the switching valve open, and in the other brake circuit, the switching valve is controlled in a pulse-width modulated or current-controlled manner. In this way, it is also possible for different pressures to be set, or set by closed-loop control, simultaneously or partially simultaneously in both brake circuits, and thus for different pressure change profiles to be realized at the same time. The pressure profile control is useful for finely metered EBV control or axle-specific ABS control as well as for the precise coordination of the braking torques, which are generated by the pressure supply, with the braking torque profile of electric motors.

The multiplex method and/or the PWM control method of the solenoid valves offers all of the degrees of freedom of highly precise brake-circuit-specific control with simultaneously high fail safety of a closed brake circuit. In this way, dormant faults are advantageously avoided, and good, simple and reliable diagnosis of leaks is possible. In order to use the PWM or current control method, the solenoid valves must be designed as normally open switching valves such that a variable opening cross section can be set through control of the voltage of the coils of the solenoid valves.

The pressure supply device can also be used to implement simplified control functions, that is to say simplified axle-specific ABS control operation (embodiment A), in the case of which the wheel pressures are controlled on an axle-specific basis, but not on a wheel-specific basis. This simplification, combined with the highly precise PPC pressure control, is sufficient for various applications, such as two-wheeled vehicles and racing vehicles with two axles, where ABS/ESP control is not permitted. With the axle-specific braking force control (EBV function), more intense decelerations can be achieved at all wheels than with pure select-low control, because the braking force distribution can be divided in accordance with the axle load distribution at the front and rear axles, that is to say, in the event of intense decelerations, a lower pressure is set at the rear axle than at the front axle. In the case of road vehicles, too, the axle-specific control merely leads to limitations only during μ-split operation, that is to say when the wheels on the right/left side of the vehicle are on ice and the wheels on the left/right side are on asphalt. In this case, the pressure is set such that none of the wheels lock. This leads to longer braking distances, but the vehicle can still be steered.

By means of embodiment B of the brake system according to the invention, wheel-specific control can be performed at one axle, whereby the system then has all degrees of freedom. Embodiment B allows wheel-specific ABS/ESP as well as the anti-slip control function (ASR), torque vectoring and steering interventions. The second embodiment B offers all degrees of freedom for an axle adjuster and can be used in modern electric axle modules with a high-powered electric traction motor, and can also be easily expanded with further valve circuitry in order to supply pressure to further hydraulic actuators in the electric axle (for example actuation of clutches of dual-clutch systems of one of the 2-ratio transmissions, which is preferably used in modern electric vehicles and is part of a vehicle axle). Since gear shifting and braking do not take place at the same time, the MUX operation of the brake and clutch does not lead to any functional limitations.

It is likewise possible that the brake system according to the invention of the first embodiment A is configured with an already known standard ABS/ESP unit, which is interconnected between the pressure supply device and the brake circuits. Here, the ABS/ESP function performs the wheel-specific control, and, in the event of failure of the ABS/ESP unit, the brake system according to the invention can still enable the axle-specific brake pressure control/axle-specific ABS function with recuperation, which means that the redundancy requirements for various levels of autonomous driving (AD), level 3 and level 4 (see ATZ [Automobiltechnische Zeitschrift, German automotive industry journal] article "Bremskraftverstärker für das autonome Fahren" ["Braking force boosters for autonomous driving"], issue March 2019), can be met. In addition, both brake modules can be applied separately and obtained from different suppliers, wherein the central brake management (M-ECU$_{BM}$) preferably takes place in the brake system according to the invention of the first embodiment A.

Particular advantages of the brake system according to the invention will be explained individually in more detail below:

Advantageous possibility of incorporating the brake system and its brake control into a domain structure of a central driving dynamics control system, with the possibility of optimizing the entire driving dynamics and incorporating multiple control actuators for brakes, steering and damping, and also incorporating the electric traction motors;

Central control of at least one electric drive motor and hydraulic brake can advantageously be used to optimize the wear of mechanical parts. For example, the wear of the brake caliper and the heating of brake calipers can be reduced by distributing the braking energy between the mechanical/hydraulic brake and the at least one electric drive motor or traction motor, which can dissipate heat very effectively owing to typical water cooling. Fading effects can thus be reduced, and the hydraulic brake system can be designed for lower pressures, which means that the pressure supply can be downsized. For example, the drive motor for the pressure supply can be designed for a low torque. In addition, the load cycles with maximum load can be reduced and the mechanical components, such as spindle drive and piston seals, can be of simpler design, because a low hydraulic load acts on the pressure supply. It is also conceivable to use a simple transmission, such as a trapezoidal spindle composed of plastics, or a plastics housing for the pressure supply, and/or to use an inexpensive rotary pump as the pressure supply. However, this requires a very powerful electric drive motor with an output of more than 100 kW. However, this downsizing potential described above can be canceled out by other control requirements, for example long periods of anti-slip control operation (ASR) on road surfaces with different coefficients of friction, because permanent operation at high pressures takes place here. This downsizing potential may therefore be limited to vehicles in autonomous driving operation at reduced speeds in certain climate zones where no critical ASR requirements have to be met (for example vehicle operation in India);

The advantageous multiplex control (MUX control) or the precise PPC control with PWM control of the valves can be used for the pressure build-up and/or pressure reduction, and thus allows very many degrees of freedom in the precise pressure control of multiple hydraulic actuators. In addition, a combination of MUX control and PPC/PWM control is possible, whereby very precise coordination with the at least one electric drive motor is possible, and at the same time brake-circuit-specific brake pressures can be set;

The EBV function, that is to say the electrical braking force distribution between the front axle and rear axle, can be implemented and applied much more easily and with higher control quality than in the case of known brake systems on the market, for example on the basis of the MKC1 brake system according to DE102013224313A1 or the brake system according to U.S. Pat. No. 9,981,645B2, because, in the known brake systems, the PPC method, MUX control and PWM control of outlet valves are not used for pressure build-up and pressure reduction, or can only be used partially owing to limitations of the hydraulic concept. For example, the MUX method requires valves that must maintain the pressure. This is not possible owing to the connection of check valves in parallel with respect to the switching valves during the pressure reduction. At the same time, the central driving dynamics control according to the invention can be used to supplement the braking torque of the electric motors in order to increase the dynamics and maximize the braking torque in the axle braking torque distribution. This allows an optimization of the braking deceleration taking into consideration different axle loads, for example, in the case of intense deceleration, significantly higher pressures at the front axle, or a different braking torque distribution requirement at the axles resulting from this; this feature is of importance for racing vehicles, for example rally vehicles with electric drives at the front and rear axles, or so-called supercars or hypercars with drive power >300 kW with simultaneously high dynamic requirements.

Advantageous possibility of optimizing the braking torque build-up dynamics through simultaneous use of the hydraulic brake system and the electric motors, whereby it is for example possible to achieve a shorter time to reach the locking pressure, in particular in the case of emergency braking functions;

Possibility of optimizing the recuperation performance by means of the electric motors, such that, in certain situations at low vehicle speeds <120 km/h, the deceleration can be realized exclusively or substantially, in particular more than two thirds ($\frac{2}{3}$) of the deceleration can be realized, by means of one or both electric drive motor(s) (traction motor(s)), for example at low driving speeds. The deceleration performance is limited here by the maximum power and the maximum torque of the electric motor;

Simple and reliable control of the brake pressures by means of the pressure supply device in multiplex operation (MUX operation) with very little expenditure on valves in the simultaneously closed brake circuit, that is to say without outlet valves that connect the brake circuits to the reservoir during closed-loop control operation, is possible. The omission of outlet valves has the advantage that the brake circuits are not hydraulically connected to the reservoir during active operation, and therefore undetected leaks in valves, for example owing to dirt particles in the valve seat (dormant faults), can be prevented or diagnosed, which increases reliability;

In certain embodiments of the system according to the invention, see in particular the embodiments shown and described in FIGS. 3 and 3a, the brake system has very high availability owing to the redundancies listed below, which may be provided individually or in combination, or may all be provided, in the brake system according to the invention:

a) redundant and simultaneously diagnosable seals in both the actuating unit and the pressure supply, b) redundant 2×3 phase contacting of the connections of the electric motor of the pressure supply, c) redundant valves connected in series between pressure supply and brake circuit and between actuating unit and brake circuit, d) redundant vehicle electrical system connections of the slave ECUs, e) redundancy by braking by means of electric motor in the event of failure or partial failure of the pressure supply, f) redundant data transmission, for example by redundant wired data transmission or wireless data transmission with high security standard (for example taking place with data transmission options with low latency, for example 5G radio data transmission or new Bluetooth protocols) or combination of wired and wireless data transmission.

Features a) to f) meet the safety requirements of a pure brake-by-wire system with electric pedal or vehicles without an actuating unit, that is to say driverless vehicles;

Very good possibility of diagnosing hydraulic faults, such as leaks or brake circuit failure, is possible owing to the design as a closed system (no dormant faults) and diagnosis by pressure build-up by means of the pressure supply is likewise possible;

The pressure supply may alternatively be configured as a piston-cylinder unit driven by an electric motor and a non-hydraulic transmission device, or as a rotary piston pump driven by an electric motor, in particular a gear pump, which is distinguished by the fact that the pressure supply in both embodiments, pressure can both be built up and be reduced using either a piston pump or a rotary pump, and the control methods described above can therefore be used. If a gear pump is used, the term "PPC pressure control method" is not applicable, and the control is instead performed by way of the piston position by way of an angular position of the rotary pump, and thus corresponds to a displaced volume, wherein advantageously the pressure-volume characteristic curve and the motor current can be used in both methods for the pressure control. If a gear pump is used, the leakage of the rotary pump owing to the operating principle must additionally be identified and taken into consideration in the control.

If there is sufficient redundancy of the actuating unit (redundant seals) or of the slave braking force generators (motors, redundant pressure supply), there is advantageously a mechanical fall-back level, wherein the actuating unit can advantageously be of very simple design in the form of a simple, inexpensive and short master brake cylinder; this is of great importance, in particular because the structural length affects the luggage compartment volume of an electric vehicle and is a critical design point from a crash perspective owing to the attachment to the bulkhead of a vehicle.

The brake system can advantageously be of modular construction for various embodiments, wherein some possible modular designs are listed below:

a. central brake management system as a separate unit or module of a central domain of the vehicle dynamics management system or part of the pressure supply device or of the control unit thereof;

b. individual modules that are taken together and assembled in various arrangements as required, such as a distributed system with separate actuating unit and separate control unit;

c. distributed system with separate actuating unit;

d. distributed system with electric pedal and separate redundant control unit and redundant data transmission;

e. integrated unit, wherein actuating unit and pressure supply are combined, with 2-circuit control, in one module;

f. pressure supply formed by a piston-cylinder unit driven by an electric motor and transmission or formed by a rotary pump, in particular in the form of a gear pump, driven by an electric motor;

g. separate ABS unit or wheel pressure control unit, which distributes brake circuit pressures between different wheels, is easily configurable and connectable connectable the pressure supply device configured as a module, wherein this is also applicable separately for wheel-specific control at the axles;

h. ABS/ESP control unit as a standalone system with a dedicated pressure supply (redundancy) or simple valve control unit using the admission pressure control by the brake system;

j. actuating unit in a separate housing, detachable from the pressure supply for the distributed system, wherein the pressure supply is arranged in parallel with respect to the actuating unit;

k. pressure supply in the form of a rotary piston pump, wherein the axis of the rotary pump is oriented perpendicular to the axis of the piston-cylinder unit of the actuating unit, wherein the rotary pump and solenoid valves are integrated in one structural unit.

l. fully variable brake system for use in an electric axle module of an electric axle for ABS/ESP, torque vectoring, steering interventions and simultaneous recuperation control by means of electric motors, and thus provided with all degrees of freedom for dynamic and at the same time precise wheel-specific pressure control with simultaneously high fail safety, redundancies and closed brake circuit. Whereas solutions according to the prior art, for example WO2018/130406, owing to check valves connected in parallel with respect to the solenoid valves of the wheel brakes, do not offer the possibility of maintaining pressures in wheels and at the same time reducing the pressures in other wheels, the axle module according to the invention has no functional limitations whatsoever, and furthermore exhibits higher control dynamics. This facilitates the development, application and optimization of a central driving dynamics control system with braking and steering interventions with simultaneous recuperation by means of electric motors, without dependency on limitations of existing system solutions. In addition, such a module can be combined with different system solutions at other axles, for example electromechanical brake H-EMB with hydraulic pressure supply as redundancy, second axle module with the same construction as at the first axle module, differentiated by a less expensive construction of the pressure supply, and easily integrable into a pure brake-by-wire solution with electric pedal or central driving dynamics control system of a driverless vehicle (robo-taxi) without an actuating unit.

Possible Areas of Application for the Brake System According to the Invention

The brake system according to the invention can be advantageously used for the following vehicle types:

- For brake systems for racing vehicles with the functionality of highly dynamic and precise axle-specific braking torque control in the context of EBV optimization (EBV=electronic braking force distribution) and simultaneous recuperation by means of at least one electric motor at one or two axles;
- For vehicles without or with only axle-specific ABS control, for example in racing, test vehicles for the development of central vehicle dynamics control systems with electric motors at multiple axles or vehicles with low ABS control requirements, such as low-speed people-mover vehicles;
- For vehicles with very high drive power and high driving dynamics requirements, so-called supercars or hypercars, with electric traction motors at multiple axles or at multiple wheels of one axle;
- For 2-wheeled vehicles with a respective electric motor at each wheel, for example electric scooters or electric pedelecs, with complete 2-wheel ABS control then being possible. For the 2-wheel solution, use is made in particular of the inexpensive electrically driven gear pump with integrated hydraulic unit HCU as per FIG. 2, which is modified such that, instead of an axle with two wheels, only one wheel is provided in a brake circuit. A design of the gear pump with an integrated HCU with valves as per FIGS. 6a, 6b can likewise be used. Compared to conventional 2-wheel ABS systems with a piston pump, it is possible by means of PPC pressure control and multiplex operation and PWM control of the solenoid valves for the pressure to be controlled very precisely and dynamically and to be optimally coordinated with the recuperation by means of the electric drive motor at a wheel, wherein the EBV control can additionally be implemented at the wheels. This improves the braking performance and safety of 2-wheeled vehicles. The central brake management system is then preferably integrated in the ECU of the pressure supply device.
- For electric bikes (electric pedelecs) with a central motor or wheel hub motor, where the central control according to the invention implements an ABS function at the two wheels, for example by incorporating torque of a wheel hub motor. If a central motor is incorporated, it must be ensured that the central drive motor does not generate any drive torque or braking torque during ABS operation and does not have an effect on the drive motor. For reasons of cost, preference is given here to an inexpensive solution for the pressure supply in the embodiment as a rotary pump with two switching valves with corresponding integration of the brake system (for example FIG. 2c).
- For vehicles with electric axle modules, for example rear axle module with a traction motor, optionally supplemented by a powershift-capable 2-ratio dual-clutch transmission for the axle or electric traction motors for the different wheels of an axle, with recuperation and also ABS/ESP, torque vectoring and/or steering function, for example as further steering actuators in addition to an electric power steering system at the front axle. The brake system according to the invention can also be used for an emergency steering function in the event of failure of the electric power steering or to supplement the steering intervention at one axle and/or at a second axle;
- For low-cost vehicles in BRIC countries, where axle-specific, brake-circuit-specific control is sufficient and, optionally, electric or electrohydraulic power steering is used for vehicle stabilization purposes;
- Modularly supplementable by separately operating ABS/ESP control unit, wherein both units can then be obtained from separate brake manufacturers and can also be applied separately for the vehicle, wherein the application of the primary brake system according to the invention can be performed by the vehicle manufacturer.
- Modularly usable in combination with an additional wheel brake module at the second axle, for example rear axle, where for example an electromechanical brake (EMB) or hydraulically assisted electromechanical brake (H-EMB) is used, wherein, in the brake system according to the invention, the two brake circuits of the brake system are then distributed between the wheels of the front axle, such that a full ABS/ESP system with additional degrees of freedom of the steering intervention and torque vectoring with simultaneous recuperation can be formed from the brake system according to the invention, wherein both axle modules according to the invention and electromechanical brake(s) EMB are integrated into the brake management system and are centrally controlled. This variant of the brake system according to the invention is predestined for an electric pedal solution or driverless vehicles without a pedal. As an alternative to the EMB or H-EMB at the second axle, the solution according to the invention can also be duplicated for the second axles.

Possible embodiments of the brake system according to the invention will be discussed in more detail below with reference to drawings.

Figure 2A:
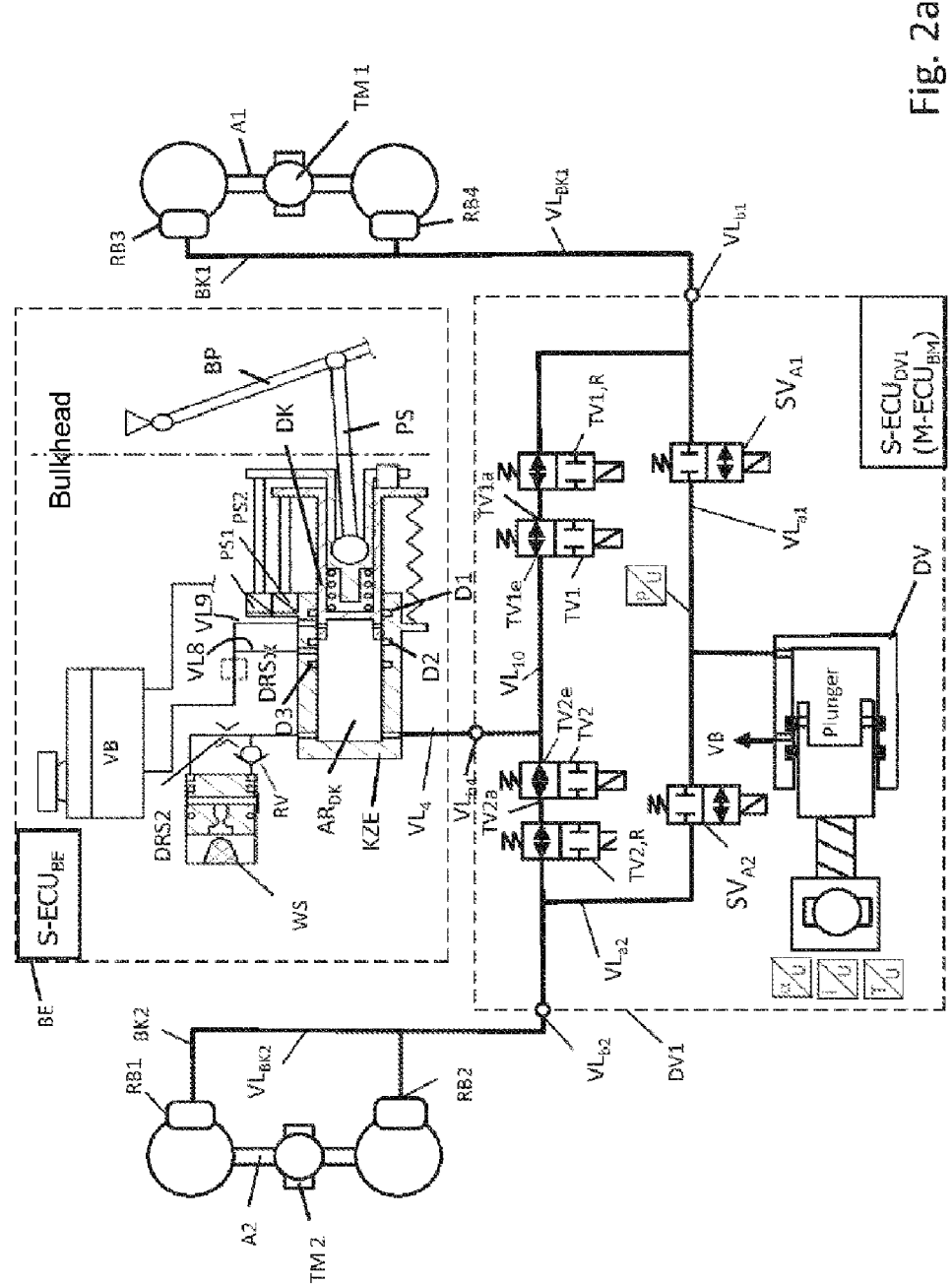
Figure 2B:
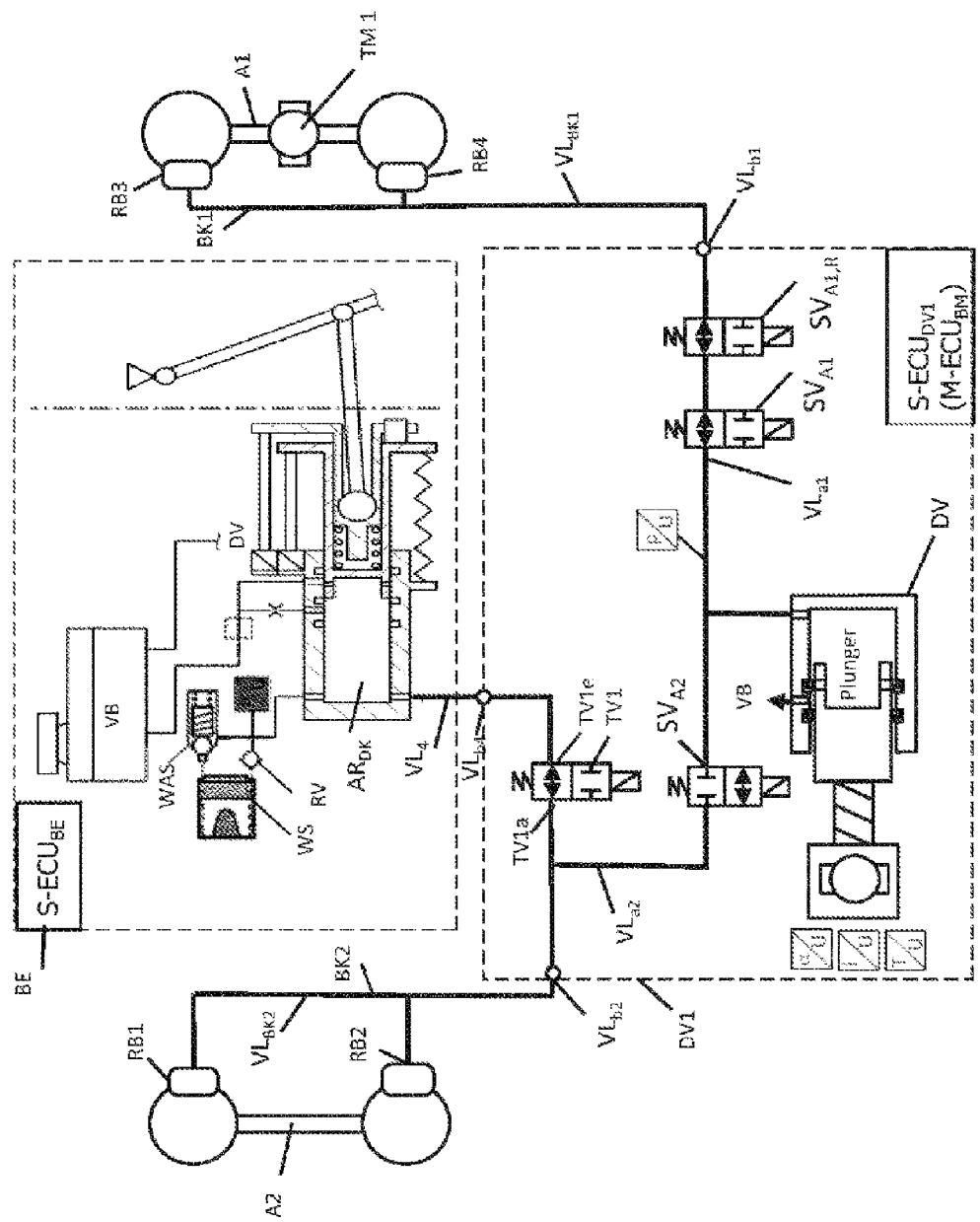
Figure 2C:
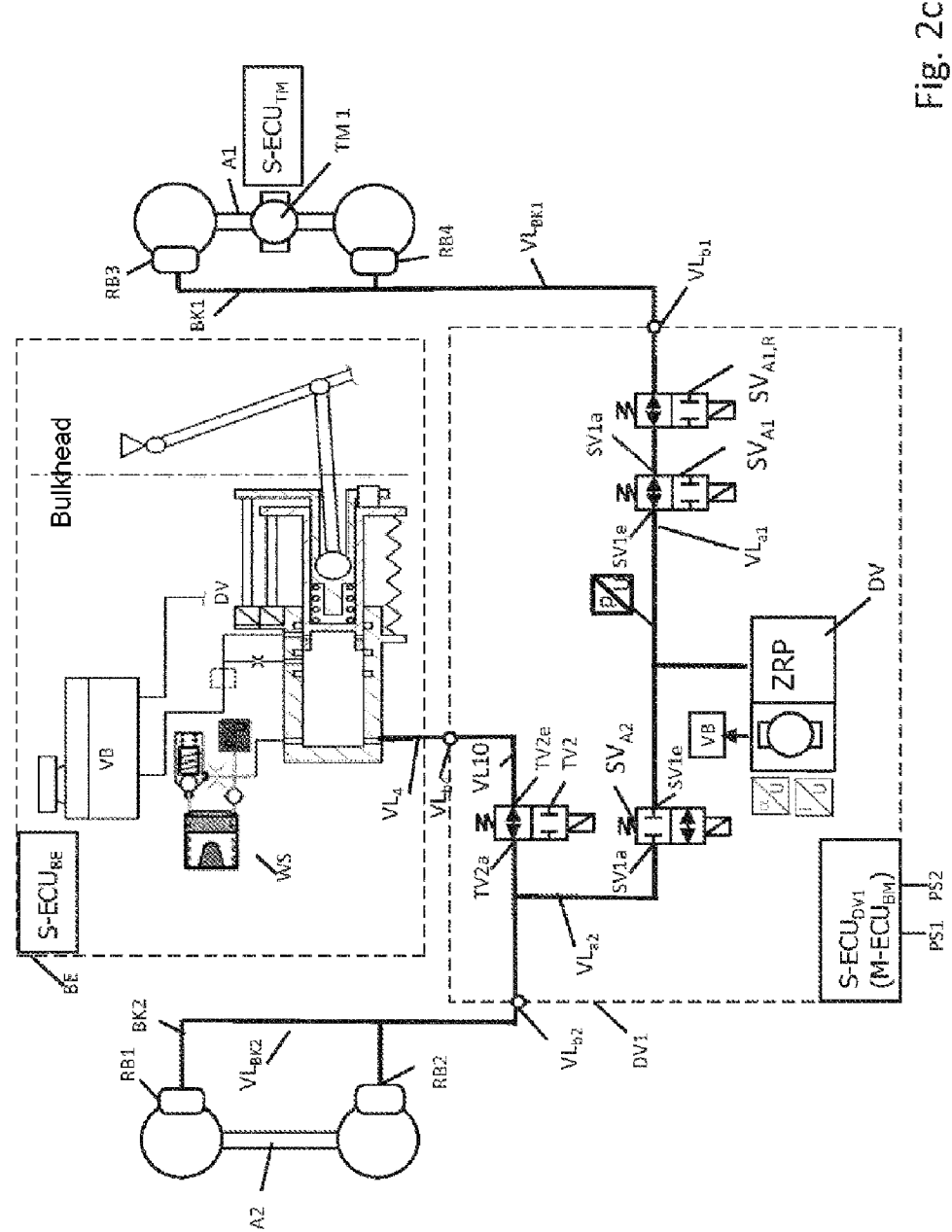
Figure 3:
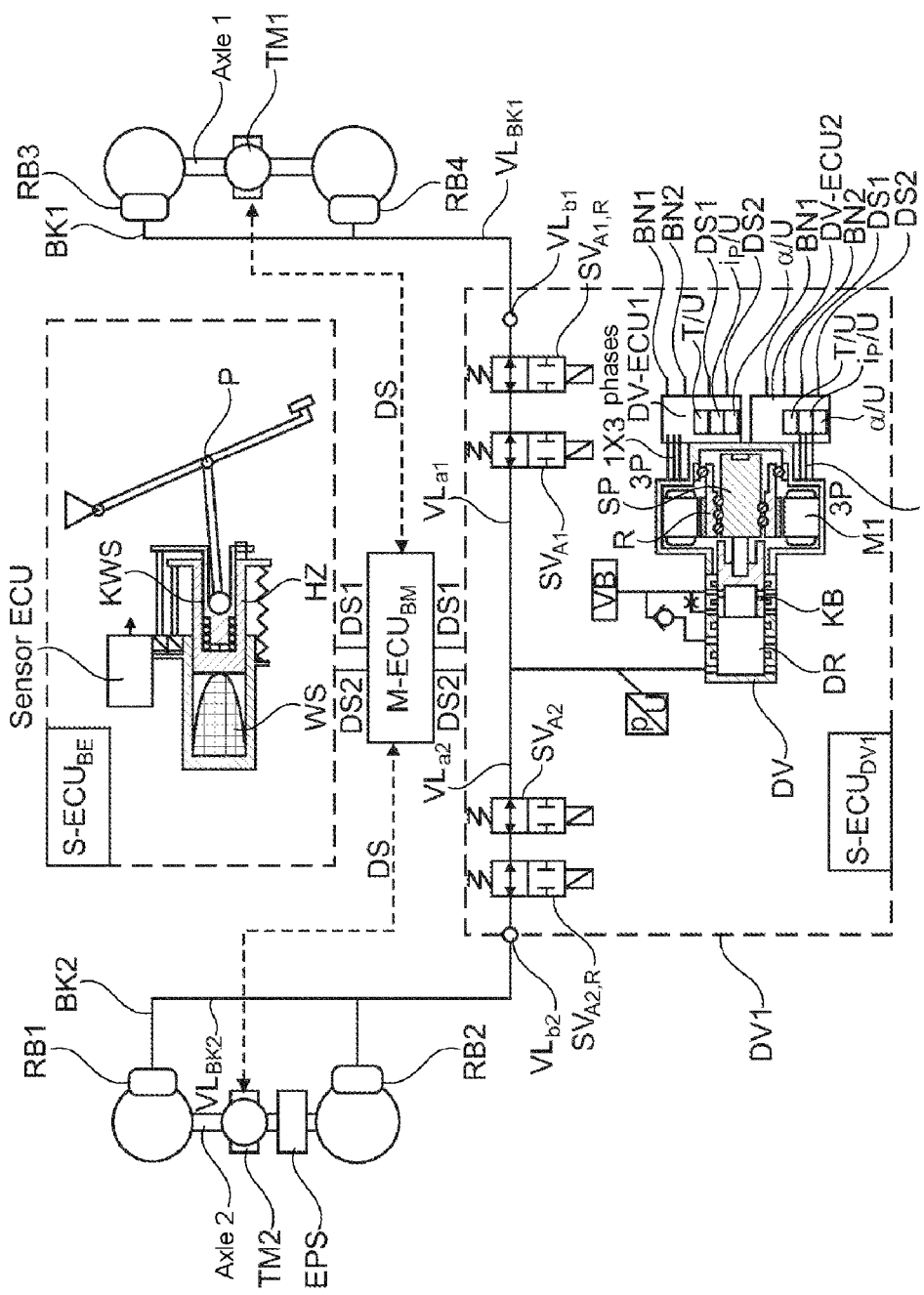
Figure 3A:
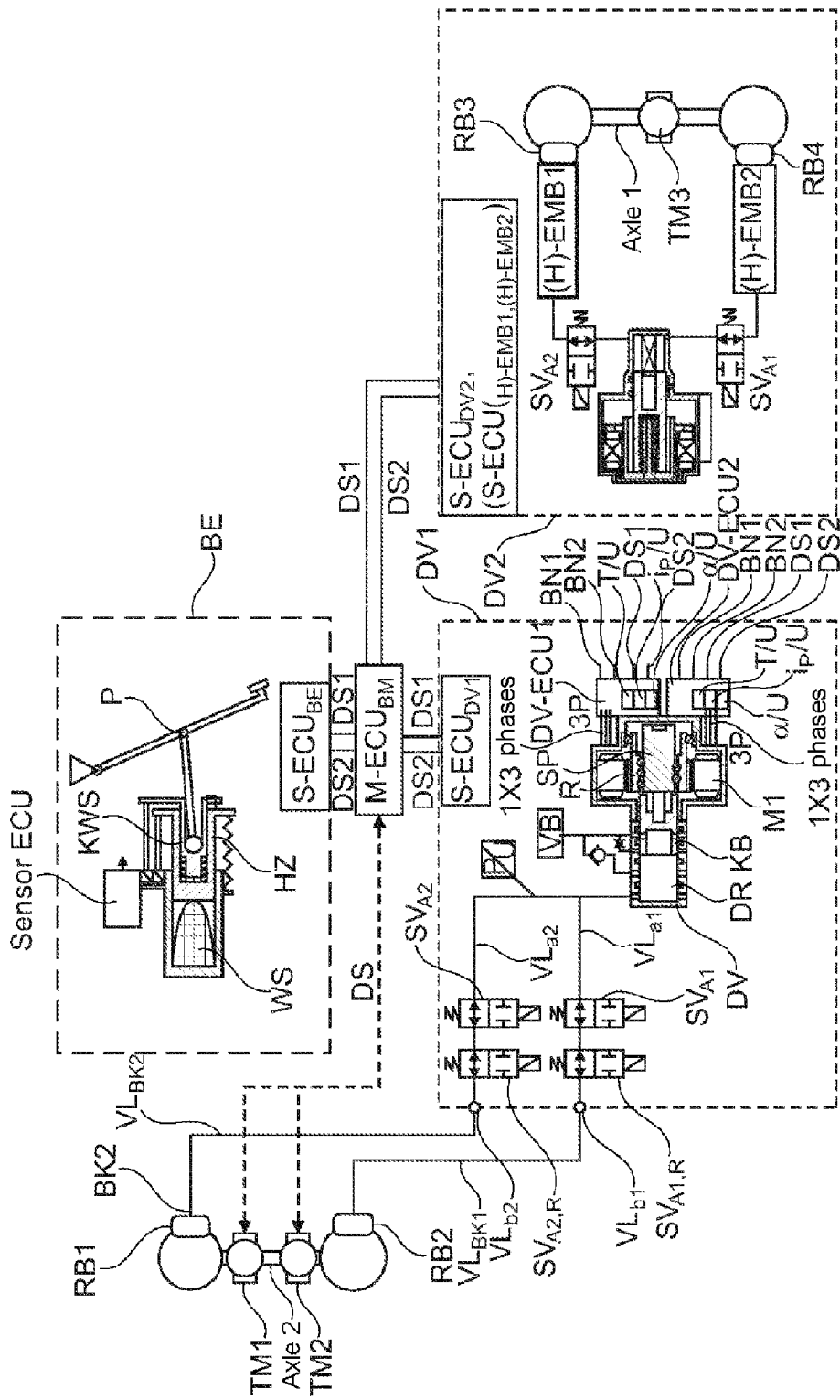
Figure 3B:
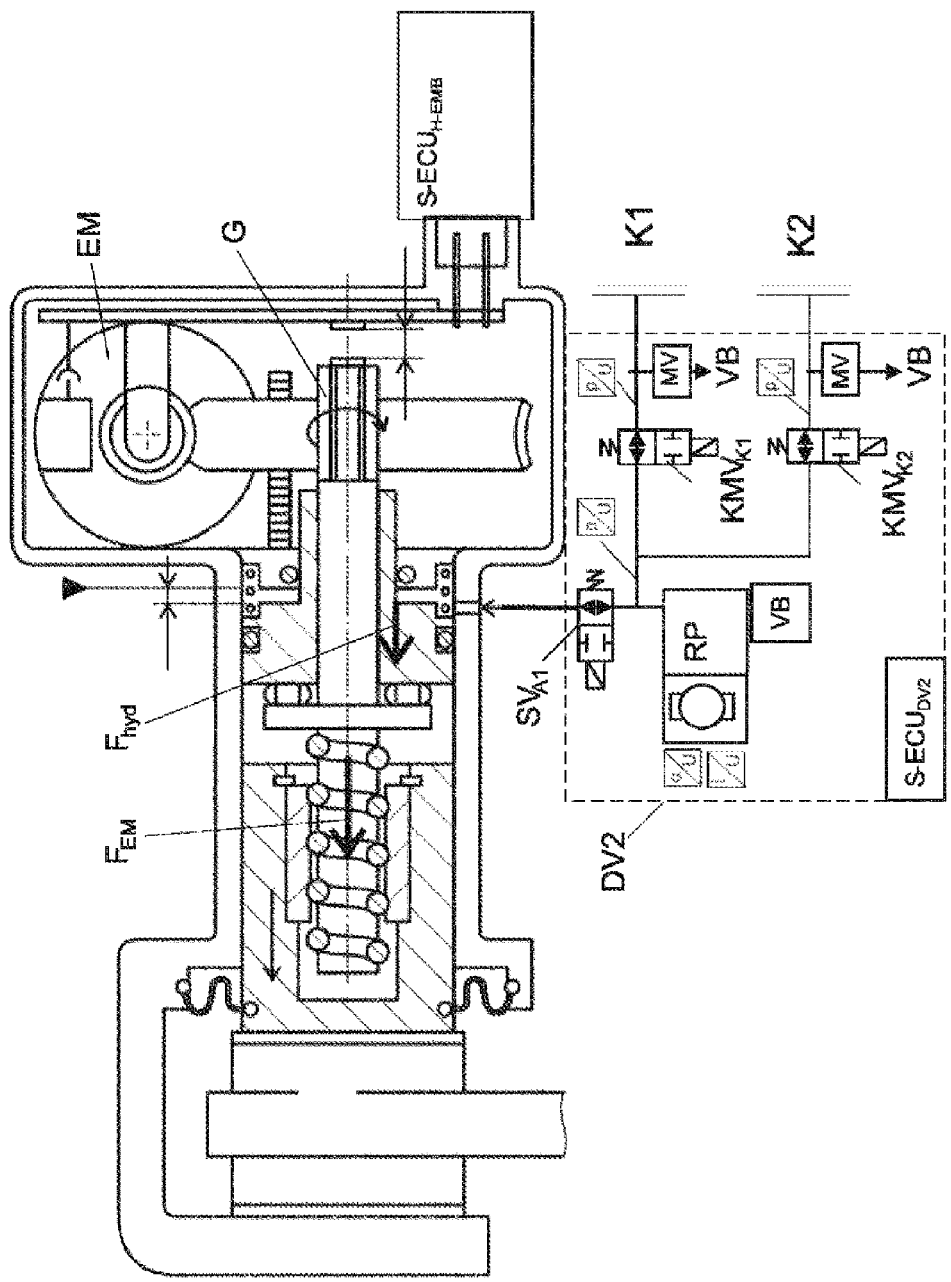
Figure 4:
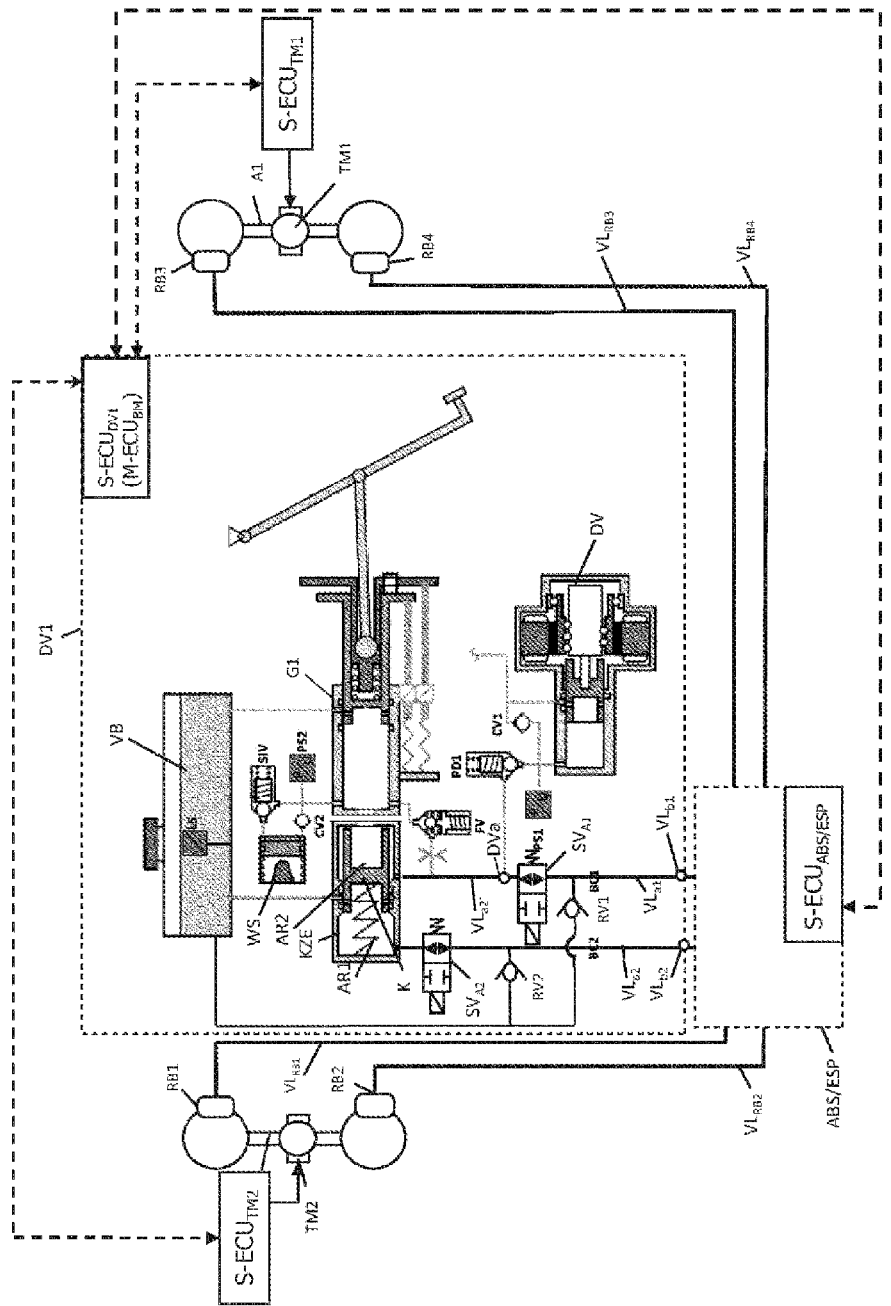
Figures 6A, 6B:
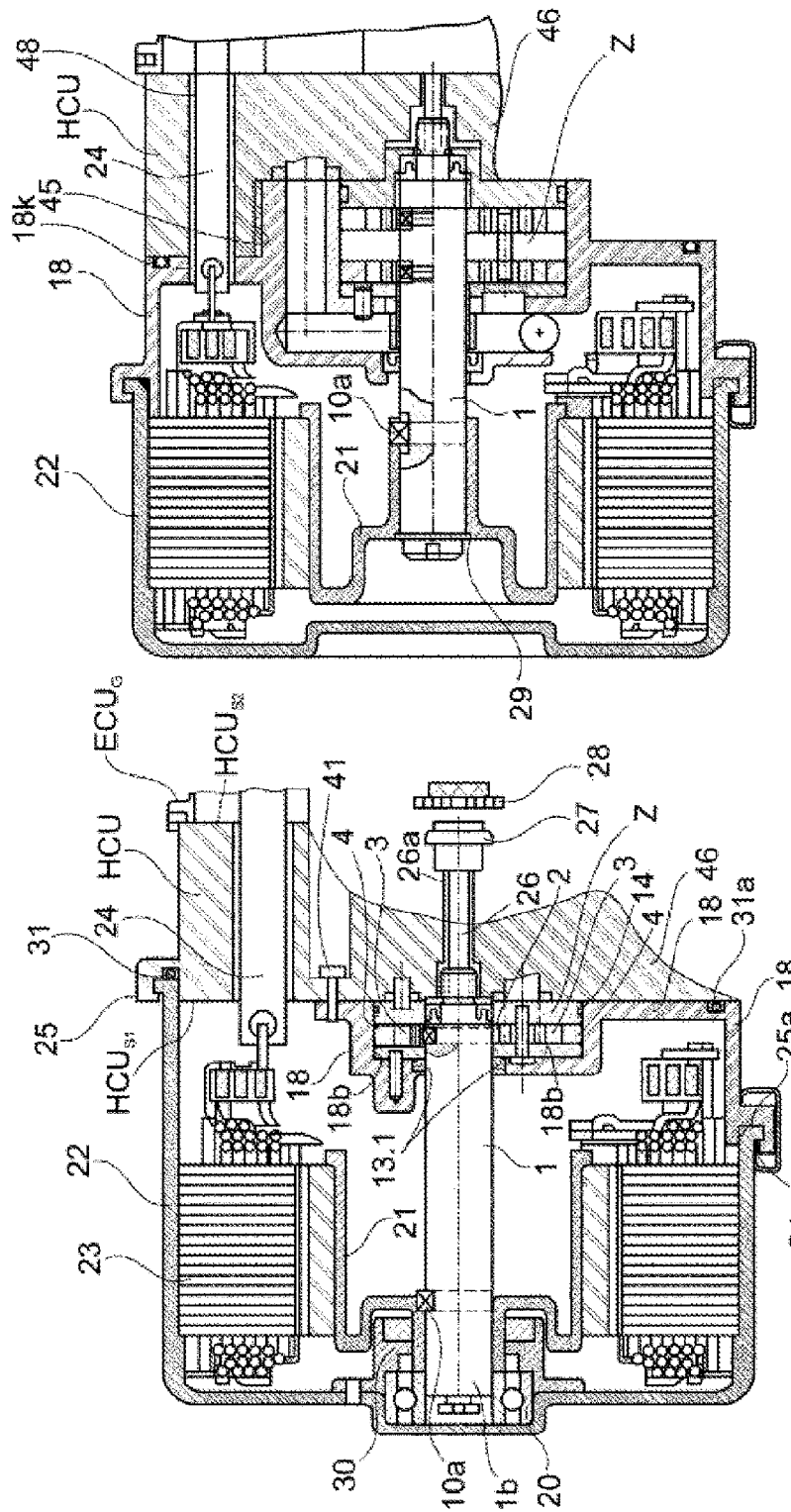
Figure 10:
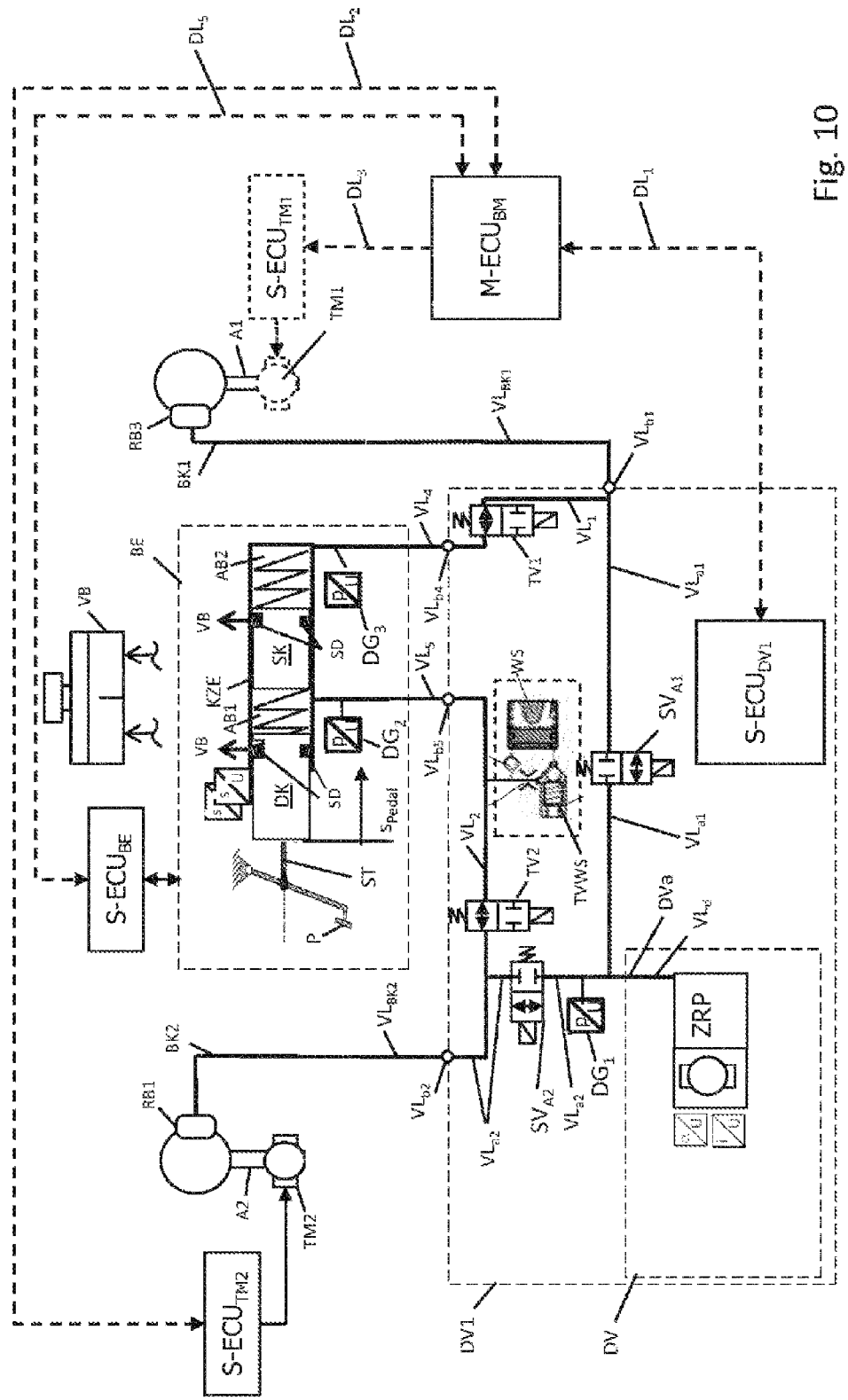

In the drawings:

FIG. 1: shows a first possible embodiment of a brake system according to the invention with a modular construction with a tandem master brake cylinder THZ and a two-circuit fall-back level at the front axle and rear axle;

FIG. 1a: shows a first possible embodiment of a central brake management system for a brake system for driver-demand-based control (FW) or alternative control in the case of autonomous driving (AD-Ctrl);

FIG. 1b: shows a further possible embodiment of the brake system, in which the second brake circuit is connected to the pressure supply device via the piston-cylinder unit of the actuating device and the switching valve is arranged between the piston-cylinder unit and the connection of the pressure supply device;

FIG. 1c: shows a further possible embodiment of the brake system, in which the second brake circuit is connected to the pressure supply device via the piston-cylinder unit of the actuating device and the switching valve is arranged between the piston-cylinder unit and the pressure supply of the pressure supply device;

FIG. 2a: shows a modification of the embodiment as per FIG. 1 with a single master brake cylinder with a branch circuit and a master brake cylinder with redundant diagnosable seals, and a gateway circuit;

FIG. 2b: shows a modification of the embodiment as per FIG. 3a, wherein only the actuating unit acts on the second brake circuit in the fall-back level, and in which a braking torque can be realized in the event of a brake circuit failure by means of a braking action of the motors at the front axle and rear axle;

FIG. 2c: shows the embodiment as in FIG. 3b, wherein the pressure supply is configured as an electrically driven rotary pump, for example a gear pump, wherein the pressure can be controlled by way of angle sensors (position of the gear pump) and current (torque);

FIG. 3: shows a fail-safe, redundant embodiment with electric pedal for recuperation and axle-specific pressure control in MUX and PWM operation;

FIG. 3a: shows an electric axle solution with central control with wheel-specific control and multiple redundancies in the brake system;

FIG. 3b: shows a cross-sectional illustration through a hydraulically assisted electromechanical brake H-EMB;

FIG. 4: shows the embodiment as per FIG. 1c supplemented by a separately operating ABS/ESP unit;

FIG. 5: shows a pressure supply with 2×3 phases and redundant diagnosable seals;

FIGS. 6a and 6b: show a pressure supply device with rotary pump and HCU integrated in the electric motor;

FIG. 7a: shows 2-channel pressure build-up control with PPC control and with additional PWM control of a valve that connects the pressure supply DV to the rear axle;

FIG. 7b: shows 2-channel pressure reduction control with PPC control and with additional PWM control of a valve that connects the pressure supply DV to the front axle;

FIG. 7c: shows 2-channel MUX control;

FIG. 8a-FIG. 9b: show various possible modular designs for the brake system according to the invention, in particular the embodiments described above;

FIG. 10: shows a brake system for 2-wheeled vehicles (one wheel at one axle).

FIG. 1 shows a first possible embodiment of a brake system according to the invention with the central control according to the invention by means of a central open-loop and closed-loop control device M-ECU$_{BM}$, which sends control signals to the open-loop and closed-loop control device S-ECU$_{DV1}$ of the pressure supply unit DV1 of the brake system and to the open-loop and closed-loop control devices S-ECU$_{TM1}$, S-ECU$_{TM2}$ of the traction motors and reads in driver demand signals from the open-loop and closed-loop control device S-ECUBE of the actuating unit BE. The brake system is of modular construction and has a separate actuating unit BE and pressure supply device DV.

The actuating device BE has a brake pedal P and an actuating rod ST, which acts on a tandem master brake cylinder THZ, which in turn is configured with a pressure piston DK and pressure piston working chamber AB1 and a floating piston SK and floating piston pressure working chamber AB2. Also provided are sensors for detecting the pedal travel and pressure transducers DG2 and DG3 for redundant driver demand detection. Alternatively, only one pressure transducer DG2 or DG3 may be used in the actuating unit BE, or the pressure transducer in the pressure supply may be omitted entirely if a force-travel sensor system KWS according to WO 2012059175A1 is used for force measurement. The pressure chambers AB1, AB2 of the pressure piston DK and of the floating piston SK are connected via breather hole seals SD to the reservoir VB for the purposes of volume replenishment. The actuating unit BE is isolated from the pressure supply DV/DV1 by means of isolating valves TV1 and TV2.

The pressure supply device DV is composed of an electrically driven piston-cylinder unit with sensors for detecting the angular position α of the rotor, motor current i and temperature T, and an HCU with pressure transducer DG1, switching valves TV1, TV2 for isolating the master brake cylinder from the brake circuits for brake-by-wire operation, and switching valves SV$_{A1}$ and SV$_{A2}$ for the brake-circuit-specific control by means of the pressure supply device DV. Additionally, a travel simulator WS is provided, which is hydraulically connected to the pressure chamber AB1 of the pressure piston via the line VL$_5$ and which can be shut off by means of a travel simulator shut-off valve TVWS.

For the control of the brake pressure in a manner coordinated with the recuperation control by means of the electric motor TM2 or TM1 of an axle, use is made of the PPC control method with evaluation of the angular position α of the rotor of the electric motor, current i of the electric motor and optionally temperature T of the motor, supplemented by the evaluation of a pressure-volume characteristic curve according to the prior art, which is preferably adapted during operation. If a temperature sensor is used, the temperature T of the electric motor is used to adapt the relationship between the current and torque of the electric motor, because the torque constant kt decreases linearly as a function of the temperature T. This is advantageously used in order to implement precise dynamic pressure change control, because the control by way of the current i is more dynamic, because pressure transducers as a setpoint signal exhibit a time delay in the detection of the actual value. The pressure transducer is primarily then used for the setpoint pressure control if the exact setting of the setpoint pressure is of importance, though may also be used for the entirety of the control. In addition, the pressure transducer is used to calibrate the pressure-volume characteristic curve that varies during operation, for example owing to air inclusions. If the pressure transducer fails, control is performed exclusively by way of the current i, the angular position α and the pressure-volume characteristic curve, whereby additional redundancy is realized.

The switching valves SV$_{A1}$ and SV$_{A2}$ are configured as normally closed valves in order to isolate the pressure supply DV from the actuating unit BE in the fall-back level. For the simultaneous control of both axles, the multiplex method (MUX method) according to the prior art is used, which is described again in FIG. 7c. Additional PWM control of the valves is not possible, because in this embodiment the switching valves are configured to be normally closed.

FIG. 1a shows the construction of a central brake management system for embodiments A and B, that is to say, in embodiment A, a brake system for example according to FIG. 1, wherein for the control is performed in accordance with driver demand (FW) by means of an actuating unit BE or, alternatively, in autonomous driving operation (AD-Ctrl), setpoint signals AD-Soll for the brake management system (BM). Here, the wheel speeds V$_{R1}$, V$_{R2}$, V$_{R3}$, V$_{R4}$ and further signals (for example yaw moment) are also taken into consideration. Here, the brake management system transmits setpoint torques M$_{soll}$ to the control systems S-ECU$_{TM1/TM2}$ of the traction motor(s) and setpoint pressures p$_{soll1}$, p$_{soll2}$ for the pressure supply to the control unit S-ECU$_{DV1}$ for the pressure supply device DV1. The setpoint pressures p$_{soll1}$ and p$_{soll2}$ are the control signals that the pressure supply device DV1 should set in the brake circuits BK1 and BK2 for the brake-circuit-specific control. In the case of driverless vehicles, the actuating unit may be omitted, and the system is operated purely in AD-Ctrl operation.

The following functions are then preferably implemented in the central brake management system of embodiment A:
- axle-specific pressure control for recuperation (recuperation),
- braking force distribution (EBV),
- axle-specific ABS for four-wheeled vehicles, ABS for two-wheeled vehicles.

If embodiment B (wheel-specific control with one wheel brake in each brake circuit, as discussed below for example in FIG. 3a), the brake management system is expanded to include a further S-ECU$_{DV2}$ or further brake actuators (for example EMB), with which setpoint pressure signals $p_{soll3}$ and $p_{soll4}$ are additionally provided to the second pressure supply DV2 for individual control of two wheel brakes in in each case one brake circuit (DV1 controls RB1 and RB2, DV controls RB3 and RB4). If an EMB is used, instead of setpoint pressures $p_{soll3}$ and $p_{soll4}$, setpoint braking torques are sent as setpoint signals. Instead of setpoint pressures $p_{soll1}$, $p_{soll2}$, $p_{soll3}$ and $p_{soll4}$, it is also possible for setpoint braking torques $M_{soll1}$, $M_{soll2}$, $M_{soll3}$ and $M_{soll4}$ to be sent to the S-ECU$_{DV1}$ and S-ECU$_{DV2}$, which setpoint braking torques are then converted into setpoint pressures in the respective S-ECU.

An ECU of an electric power steering system (S-ECU$_{EPS}$) is optionally also incorporated into the brake management system. This is used to synchronize torque vectoring or yaw moment interventions of the S-ECU$_{DV1}$ or S-ECU$_{DV2}$ with the electric power steering system EPS in context of steering system redundancy (emergency steering in the event of failure of the power steering system) or improve agility through the simultaneous use of electric power steering and torque vectoring.

The following primary functions are then preferably implemented in the central brake management system of embodiment B:
- axle-specific pressure control for maximizing recuperation by means of traction motors
- electronic braking force distribution (EBV)
- wheel-specific ABS, ESP, ASR
- vehicle steering (steering/yaw moment interventions of the power steering system and the brake system)
- activation of the electric parking brake (H-EMB)

The brake management system can be expanded to include further axles and further pressure actuators for further axles (for example for heavy goods vehicles), and furthermore, in addition to the above functions, the conventional functions of ABS/ESP systems and driver assistance functions can be implemented in the central brake management system or optionally relocated into the slave ECU or AD-Crtl control system.

FIG. 1b shows the X-Boost electric braking force booster of a 2-box brake system, as defined in WO2018233854A1—page 4, and described in the text of the patent. The X-Boost is used in WO2018233854A1 with an ESP system. By contrast to the disclosure, the X-Boost is operated as a stand-alone unit without the 2nd box (ESP unit) and has two switching valves SV$_{A1}$ and SV$_{A2}$ for the individual operation of the brake circuits BK1 and BK2. The pressure is controlled by means of the pressure supply DV by forward and backward movement of the piston of the pressure supply, wherein the pressure is transmitted via a hydraulic connection via the PD1 valve and SV$_{A1}$ valve to the brake circuit BK1 and then via the PD1 valve and via the floating piston K and SV2 valve into the brake circuit BK2. The switching valves are preferably of normally open design, whereby the previously implemented brake-circuit-specific simultaneous or partially simultaneous pressure profile control by way of PPC control of the piston of the pressure supply DV, in one brake circuit supplemented by PWM control or current control of the switching valves SV$_{A1}$ and SV$_{A2}$, is or can be realized. The multiplex method may also be used here as an alternative or in addition to PWM control.

The ECU of the X-Boost is implemented here as a slave ECU S-ECU$_{DV1}$ or master ECU$_{BM}$. In the embodiment as S-ECU$_{DV1}$, the control of the X-Boost is integrated into a central control system, and in the embodiment as master ECU$_{BM}$, the ECUs of the traction motor TM1 or TM2 of one axle or of two traction motors at 2 axles are controlled by means of the control electronics of the X-Boost. The recuperation control is thus optimally combined with the brake-circuit-specific brake circuit control.

The pressure supply DV is designed as a piston pump which is driven by means of an electric motor and a spindle drive. A rotary pump may also be used as an alternative to the piston pump. Inventive embodiments of a rotary pump as a gear pump with HCU are discussed in more detail in FIGS. 6a and 6b.

In addition, it may be advantageous for manufacturing reasons to divide the master brake cylinder into two housing parts G1 and G2, with the first housing G1 having the pressure piston of the actuating unit BE and the second housing having a floating piston K. This allows a structural form as discussed below in FIG. 8a.

FIG. 1c shows a further possible embodiment of the brake system with a construction of the braking force booster (X-Boost) with functionality as in FIG. 1b, but with an alternative valve circuit. Here, the switching valve SV$_{A2}$ is connected directly to the pressure supply DV and the transmission of pressure into the brake circuit BK2 takes place via the floating piston K. The transmission of pressure into the brake circuit BK1 takes place via the SV$_{A1}$ valve directly without an upstream PD1 valve. By means of this design, the throttling resistances between pressure supply DV and brake circuit BK1 can be reduced, and the throttling losses between pressure supply DV and BK1 and BK2 can be made approximately equal. The throttling action between the pressure supply and brake circuit BK2 is only slightly higher owing to the friction of the seals of the floating piston K. The brake-circuit-specific control in the application can thus be simplified in comparison with the embodiment of FIG. 1b. The first piston of the actuating unit BE is used for driver demand detection and for the fall-back level. In the fall-back level, that is to say in the event of failure of the pressure supply, the pressure is conducted via isolating valves TV1 into brake circuit BK1 and via TV2 and floating piston K into brake circuit BK2. In addition, a plunger STB is optionally provided, which in the fall-back level can act directly on the floating piston K.

In FIG. 1c, the two pistons of the actuating unit BE are arranged in one housing. Alternatively, the piston KBE of the actuating unit BE may be arranged in a first housing and the floating piston K may be arranged in a second housing. A separation of the housings allows for a construction of the brake system that is advantageous from a manufacturing aspect, as discussed in more detail in FIG. 8a. In the context of the modular design, this construction can, using the same production technology, be expediently modified for an electric pedal solution with a separate actuating unit and pressure generator with solenoid valves.

FIG. 2a shows a modification of the embodiment as per FIG. 1 with a single master brake cylinder with a T-branch circuit with two isolating valves TV1 and TV2, which can establish a connection between the master brake cylinder and the brake circuit BK1 and/or the brake circuit BK2. The pressure control in the brake circuit BK1 and BK2 is performed by means of an electrically driven piston-cylinder unit in the PPC pressure control method using the angular position of the rotor, current and temperature of the electric motor, and multiplex operation. This limitation is expedient because normally closed solenoid valves isolate the brake circuits from the pressure supply in the event of failure of the pressure supply the pressure supply in an effective manner from the actuating unit BE. In the event of failure, the pressure of the actuating unit BE then acts selectively in both brake circuits or only in one brake circuit. This decision may be made in a manner dependent on the detected fault situation, and the availability of the traction motors at one or both axles can be used to generate additional braking torque in order to realize more intense deceleration or, in the event of a double fault, failure of the pressure supply and brake circuit, to ensure sufficient deceleration. In the event of a brake circuit failure, the hydraulic pressure is conducted only into the brake circuit that has not failed, and the respective axle where the brake circuit has failed is braked using the motor torque of the traction motor. This means that sufficient deceleration is possible even in the event of a fault, whereby the legal requirements for the emergency braking function in standard vehicles of approximately 0.5 g are met.

To improve safety, two series-connected isolating valves TV1 and $TV1_R$ and TV2 and $TV2_R$ may optionally be provided such that, in the event of a brake circuit failure, the second brake circuit is not affected and the pressure control does not affect the master brake cylinder.

In order to further improve reliability, a special master brake cylinder with 3 redundant seals with diagnosis capability is provided instead of a tandem master brake cylinder. The master brake cylinder has the seals D1, D2 and D3 and also connecting lines VL8 and VL9 to the reservoir VB. Firstly, such a construction makes redundant seals possible, and secondly the failure can be diagnosed.

The master cylinder KZE is actuated by means of a pedal tappet PS via a pressure piston DK, which is connected in a known manner to the reservoir VB via a breather hole. The DK piston is sealed by various seals in the master cylinder KZE: a secondary seal D1 to the outside, a seal D2 with respect to the pressure chamber ARDK, and a seal D3 as a redundant seal for D2 with throttle DRS. If seal D3 fails, a leakage flow occurs that is limited by the throttle DRS. This leakage flow is detected as a loss of volume, and pedal travel lengthening, by two pedal travel sensors PS1, PS2. The throttle DRS is dimensioned such that the pedal travel lengthening during braking is only slight. The throttle DRS may also be used in lines D1 and D2 to the reservoir VB, with an additional check valve (not illustrated) parallel to the throttle DRS, which check valve opens toward D1/D2.

The pressure chamber ARDK of the master brake cylinder is furthermore connected to a travel simulator WS for the brake-by-wire functionality. A check valve and a further throttle DRS2 are arranged between the travel simulator and the pressure chamber. The master brake cylinder has redundant pedal travel sensors based on the force-travel sensor principle (U.S. Pat. No. 9,541,102). The actuating force of the driver can thus be evaluated by way of the pedal travel and the differential travel measurement by way of an elastic element. If the force-travel sensor principle is dispensed with, a pressure transducer is required that measures the pressure in the working chamber ARDK. This may be provided in addition to the force-travel sensor principle for redundancy purposes.

FIG. 2b shows a modification of the embodiment as per FIG. 2a, wherein only the actuating unit BE acts on the second brake circuit BK2 in the fall-back level, and the traction motors TM1 and TM2 at one or both axles A1, A2 additionally contribute to the deceleration of the wheels in the event of a fault. The master brake cylinder is also designed differently.

The pressure control in the brake circuits is performed, analogously to the situation in the brake system shown in FIG. 2a, by means of the pressure supply unit DV1. Here, redundant switching valves $SV_{A1}$ and $SV_{A1,R}$, which are normally open, are provided for safely isolating the axle A1 in the event of a brake circuit failure. This means that, in addition to the PPC and MUX control, the PWM control of the solenoid valves can also be used for the pressure profile control. Owing to the normally open design, dormant faults can occur, for example dirt particles prevent the valves from closing. Therefore, series-connected valves $SV_{A1}$ and $SV_{A1,R}$ are advantageous in ensuring that a brake circuit failure BK1 at the axle A1 does not lead to a total failure of the pressure boosting. Even in the case of a brake circuit failure, the brake circuit BK2 is additionally isolated from the brake circuit BK1 by means of a normally closed valve $SV_{A2}$. The normally closed switching valve $SV_{A2}$ is also used as an isolating valve in the fall-back level in the fall-back level, and isolates the actuating unit from the pressure supply. This series connection is not necessary in the connection between the pressure supply and brake circuit BK2, because a normally closed valve $SV_{A2}$ is used, which is not susceptible to dormant faults.

As in FIG. 2, the master brake cylinder has redundant diagnosable seals and differs from the variant in FIG. 2 in that a travel simulator shut-off valve WAS and a pressure transducer for measuring the pressure in the pressure chamber $AR_{DK}$ for the purposes of driver demand detection are provided. By means of the pressure transducer, the actuating force can be detected redundantly by means of the pressure transducer and force-travel sensor. The travel simulator shut-off valve WAS is used to reduce idle travel in the event of failure of the pressure supply and to feed the pressure of the actuating unit into the brake circuit BK2 via an isolating valve. However, the travel simulator shut-off valve may also be omitted if the travel simulator is designed appropriately and an idle travel is accepted.

FIG. 2c shows a further possible embodiment with the same hydraulic concept as in FIG. 2b, with the difference that the pressure supply is configured as an electrically driven rotary pump, for example gear pump as per the embodiments in FIGS. 7a and 7b, wherein the control of the pressure may be performed by means of angle sensors (position of the gear pump via the rotor position of the motor) and the motor phase current for estimating the motor torque and the pressure. The gear pump may be used, like a piston-cylinder unit, for the pressure build-up and pressure reduction. For the pressure reduction, it is simply the case that the direction of rotation of the motor of the gear pump is changed. Furthermore, in the case of the gear pump, too, the PPC and MUX control may be used, and a further degree of freedom in the pressure profile control can be achieved by PWM control of the solenoid valves with normally open valves between the pressure supply and brake circuit BK1. By contrast to the pressure supply in the form of a piston-cylinder unit, in the control leakage of a gear pump must be taken into consideration in the pressure control. Therefore, when the target pressure is reached, the pressure is preferably maintained by closing the switching valves $SV_{A1}$ and/or $SV_{A2}$.

FIG. 3 shows a pure brake-by-wire solution without a hydraulic connection between the actuating unit BE and the brake circuit with an electric pedal. A central M-ECU$_{BM}$ reads in the signals from the electric pedal and sends setpoint signals to the open-loop and closed-loop control device S-ECU$_{DV1}$ of the pressure supply unit DV1. Redundant signal lines DS1 and DS2 are used for signal transmission. The redundant data transmissions may take place in wired form or else, in future, wirelessly (for example with data transmission options with low latency, for example 5G data transmission or Bluetooth protocols). The pressure supply DV and the connection to the brake circuits are provided with multiple redundancies, as discussed in more detail in FIG. 5, wherein the brake circuits with the pressure supply can be shut off, or are isolated, in each case by means of two series-connected normally open solenoid valves SV$_{A1}$, SV$_{A1,R}$ for brake circuit BK2 and SV$_{A2}$ and SV$_{A2,R}$ for brake circuit BK1, in order that dormant faults in one brake circuit cannot affect the second brake circuit. Since the valves do not need to implement a shut-off function with respect to the actuating unit BE, they can be designed to be normally open and thus allow all degrees of freedom in the brake-circuit-specific control (PPC control, PPC+PMW control, PPC+MUX control) and can be very effectively coordinated with the braking torque of one or more traction motors TM1, TM2.

FIG. 3a shows the embodiment B of the brake system according to the invention, wherein a brake system is provided as a module for an electric axle and the two brake circuits of the brake system serve the wheel brakes RB1 and RB2 of one axle A2. Series-connected switching valves SV$_{A1}$ and SV$_{A1,R}$, and SV$_{A2}$ and SV$_{A2,R}$, are provided between the pressure supply and the wheel brakes in order that the failure of one brake circuit, as described above, does not affect the pressure supply and lead to the failure of the second brake circuit. One traction motor TM1 or two electric traction motors TM1/TM2 are provided at the axle 2, wherein the traction motor(s) can drive the axle or the wheels directly. This embodiment is selected for example for a rear axle, where the electric traction motors can better transmit their action to the road owing to the weight distribution during acceleration, in particular in the case of high-powered vehicles.

As an alternative or in addition to the traction motors TM1/TM2, an electric power steering system may also be used at the axle A2. This is expedient for example if the axle A2 is the front axle of a motor vehicle, where the electric power steering system is typically arranged.

The pressure control is performed by PPC, MUX or PPC with PWM control/current control of the normally open switching valves. The braking torques can be boosted by means of the electric motors in the context of high braking force dynamics or in the context of further redundancies. In addition, ABS/ESP control at an axle, and also torque vectoring and steering functions, can be implemented by means of the various possible embodiments. In addition, the pressure supply is redundant in several ways. Redundant seals that can be diagnosed are provided, along with redundant sensors for angular position, temperature and current, and a redundant vehicle electrical system connection. If a ball screw drive is used as a transmission, dirt particles entering the ball raceway can cause the spindle to become blocked. Appropriate quality measures must be implemented to prevent this. Alternatively, a trapezoidal spindle without balls may be used, with the disadvantage of poorer efficiency and lower load capacity. It is also conceivable for an electrically driven rotary pump to be used instead of the electrically driven piston pump.

In the embodiment B with the central brake control system M-ECU$_{BM}$, a further brake system, or an actuator for generating braking force, is preferably also provided for a further axle (axle 1). This may be a module identical to that which serves axle 2, or may alternatively be an electromechanical brake EMB or an electromechanical brake (H-EMB) which is hydraulically assisted by means of a pressure supply and which is described in more detail in an exemplary embodiment in FIG. 3b. In addition, axle 2 may also be of similar design to the module of axle 1. Each axle may be configured individually and may also comprise parts of the axle solutions presented (for example omission of redundancies in the pressure supply and series-connected valves) and can be supplemented by electric power steering at one or both axles. The corresponding solution is driven by safety requirements according to the levels of automated driving and the vehicle type.

The H-EMB is connected by means of a switching valve to a pressure supply DV2. By means of the switching valve, the pressure can be maintained, or a second H-EMB can also be connected. Both H-EMBs are operated in MUX operation or in the PPC method with optional PWM control/current control of the solenoid valves, and can generate a braking torque alternatively using the electric motor of the H-EMB, or simultaneously hydraulically and electrically. In addition, the parking brake can be replicated by the H-EMB module, for example by means of a transmission with self-locking, and a redundancy of the wheel-specific control can thus furthermore be generated by hydraulic or electrical actuation of the H-EMB.

In an embodiment as an H-EMB, the pressure supply can be significantly simplified in relation to the axle 2, because an electric motor of the H-EMB module is additionally available to generate braking force. The piston pump (piston-cylinder unit) can thus be provided with a plastics housing, and/or an inexpensive trapezoidal spindle can be used. The torque of the drive motor can also be dimensioned to be very low. Here, too, the use of an inexpensive electric rotary pump as a pressure supply is possible and advantageous.

Such a solution is predestined for an electric pedal solution with a redundant data line DS1 and DS2. The pressure supply or supplies DV1, DV2 serve(s) as slave, which is or are controlled by means of an open-loop and closed-loop control unit M-ECU$_{BM}$. It is thus possible for all degrees of freedom of the driving dynamics (ABS/ESP control, braking force generation, recuperation by means of traction motors, steering interventions by means of brakes and/or electric power steering system, torque vectoring by means of brakes or traction motors) to be controlled, and at the same time all functions are redundantly available with performance limitations.

FIG. 3b shows a cross-sectional illustration through a hydraulically assisted electromechanical brake H-EMB, which can be connected to the pressure supply device DV2 via a hydraulic connection HL, such that a force can be applied to the brake disks either by means of the hydraulic system and/or the electric motor EM. The rotational movement of the electric motor is converted here into a linear movement by means of a transmission G and generates the force FEM on the wheel brake. The transmission G is preferably of self-locking design, such that the parking brake functions reliably when the vehicle is stationary in the event of failure of the vehicle electrical system. In addition to the electric motor, a hydraulic force F$_{hyd}$ is generated by means of the pressure supply. Depending on the design of the EM as a brush-type motor or brushless motor with low or relatively high power, the dynamics of the braking torque change and the additionally available braking torque from the H-EMB can be determined, and coordinated with the hydraulic brake, through appropriate configuration of the components.

The pressure supply device DV2 is designed here as an electrically driven rotary piston pump RP as an alternative to the piston pump (FIG. 3a). The rotary piston pump RP is advantageously constructed as shown in FIG. 6a and FIG. 6b.

In addition to the actuation of the brake, the pressure supply can, by means of one solenoid valve KMVK1, be used to actuate one clutch, or, by means of two solenoid valves, or separate hydraulic lines, said pressure supply can also be used to actuate 2 clutches. Two clutches K1, K2 are provided, for example, for a powershift-capable two-ratio transmission for an electric motor TM3. Solenoid valves are also provided for the pressure reduction in the clutch, which solenoid valves are connected to a reservoir for pressure reduction purposes and are typically designed as proportional valves or switching valves. PWM operation is typically used for the pressure reduction. In this case, axle 1 is typically the rear axle of a motor vehicle. The brake and clutch are preferably actuated in MUX operation, because no gearshifts are performed at the same time. In addition, the PPC method and PPC method with PWM/current control of the solenoid valves may also be used here as a further degree of freedom. If different hydraulic media are required for the actuation of the H-EMB and the clutches, corresponding media separation must be provided. The transmission of pressure to the clutch is then performed for example by means of a media-separating piston, and the clutch system K1 and K2 is provided with a separate reservoir from which hydraulic fluid is drawn and returned. System-isolating means, such as those set out in WO10037519_A2, or the use of storage chambers are also possible. FIG. 3a therefore only shows the basic control of H-EMB and clutch, and may have to be expanded for safety reasons/media separation requirements.

FIG. 4 shows an embodiment with a braking force booster (X-Boost) according to FIG. 1c, supplemented by a separately operating ABS/ESP unit that is connected to the outlet line $VL_{b1}$ and $VL_{b2}$. The ABS/ESP unit performs the wheel-specific control of brake pressures during ABS/ESP driving dynamics interventions, and the braking force booster (X-Boost) performs the braking force boosting and the blending function. The EBV control or axle-specific ABS can be implemented in both units.

The X-Boost substantially corresponds to the construction of FIG. 1b and differs therefrom only in two aspects. Thus, no actuating plunger STB is provided which creates a mechanical connection between the pressure piston/brake pedal and the floating piston and which thus, in the event of failure of one brake circuit, ensures that the driver can still intervene in the other brake circuit in the required manner. This is admissible for many applications owing to the redundancy of the pressure supplies. In addition, check valves RV1 and RV2 are provided to ensure that fluid is quickly drawn out of the reservoir of the ABS unit in the event of failure of the X-Boost. This addition is highly recommended for a 2-box brake system solution. Housings G1 and G2 are separate and thus allow an advantageous construction as per the illustration in FIG. 8a.

In this embodiment, too, the components of the braking force system and the electric motors are controlled centrally by means of an open-loop and closed-loop control device M-ECU$_{BM}$, and the open-loop and closed-loop control device S-ECU$_{ESP/ABS}$ is also incorporated into the control system, for example for corresponding valve actuation of the solenoid valves of the ABS/ESP unit for the axle-specific recuperation control, which is controlled primarily by means of the M-ECU$_{BM}$. The valves $SV_{A1}$ and $SV_{A2}$ are thus preferably used in recuperation operation, though it is alternatively also possible for solenoid valves of the ABS/ESP unit to receive setpoint actuating signals via the M-ECU$_{BM}$, provided access to the S-ECU$_{ABS/ESP}$ is possible. This is the less preferred solution, because the ABS/ESP units generally have closed system architectures from Tier 1 manufacturers, and access is possible only in close cooperation with an ABS/ESP manufacturer, and the signal transmission is furthermore prone to faults. Therefore, in the context of a simple structure, functions of the axle-specific braking force control and recuperation are the primary master function of the X-Boost, and control functions for ABS/ESP operation are the primary function of the ABS/ESP unit.

FIG. 5 shows a redundant pressure supply in the form of an electrically driven piston-cylinder unit with 2×3 phases and redundant diagnosable seals. The pressure supply device DV1 has two open-loop and closed-loop control devices DV-ECU1 and DV-ECU2. The pressure supply device also has an electric motor M1, the rotor R of which adjusts a spindle SP, which is connected to a piston KB. A pressure can be built up in the pressure chamber DR by the adjustment of the piston KB, which pressure can be conducted via the isolating valve TV into a brake circuit BK. The piston is sealed in the cylinder by means of multiple redundant seals, wherein, as in the case of the actuating unit BE, a redundant diagnosable sealing system is created. In the case of the pressure supply device, too, in each case one hydraulic line runs between the seals to the reservoir. Thus, even if one seal fails, the pressure supply is still fully operational and redundant. The failure of seals is detected analogously to the redundant master brake cylinder as per FIG. 2a. The pressure chamber DR is connected to the reservoir via a check valve. In this way, the pressure supply can provide a replenishing action and thus provide a continuous delivery action with short time interruptions. Each of the two open-loop and closed-loop control devices DV-ECU1 and DV-ECU2 is connected via 1×3 phase lines to respectively separate winding or phase systems of motor M1, such that, in the event of failure of one open-loop and closed-loop control device or one winding system, the motor M1 can still be operated by way of the other winding or phase system and the other open-loop and closed-loop control device, even if then only approximately half of the torque can be generated by means of the drive M1. One or both open-loop and closed-loop control device(s) has or have sensors for determining the temperature T, the motor current i and the rotor angle of the electric motor α. The measurement data from the sensors are used for precise PPC pressure control and also for operation in the event of failure of a pressure transducer. To achieve high availability, not only are the open-loop and closed-loop control devices DV-ECU of redundant configuration, but power supplies BN1, BN2 and data and control lines DS1 and DS2 are also provided in duplex configuration. The power supplies BN1 and BN2 may for example be different voltage levels of one vehicle electrical system, or separate vehicle electrical systems.

FIGS. 6 and 6a show possible configurations of the pressure supply with a rotary pump. FIG. 6 shows an illustration of the entire structural unit composed of motor 22, pump Z, HCU and ECU, which is capable of performing the closed-loop pressure control and open-loop control for brake systems. The main purpose here is to illustrate the combination of motor and pump. The pump is arranged in the bearing flange 18, or fastened in a separate pump housing 40, as illustrated in the upper half of the figure, to the HCU or ECU. The HCU comprises solenoid valves and pressure transducers that are required for the respective solution. Thus, in the embodiment according to FIG. 3c and FIG. 3b, the solenoid valves and the pressure transducer DG are integrated in the HCU. The HCU may also comprise hydraulic components and sensors for the actuation of clutches (solenoid valves, pressure transducers). The motor is composed, in the conventional manner, of a rotor 21, which is connected to the shaft 1 via the driver 10a. The rotor 21 is axially preloaded by means of a permanent magnet in the housing 30, by the force of said permanent magnet. This is a solution for the motor manufacturer, who manufactures the motor with housing 22 and stator and winding 23, tests it and delivers it to the system supplier. Here, the motor is tested, without a pump, using an auxiliary shaft. Then, when the shaft is removed, the rotor is centered by the axial magnetic force, such that the shaft 1 can subsequently be assembled with the rotor during the final assembly process. Here, the drive housing must additionally be joined and fastened to the flange 18 at 25a, illustrated in the lower half of the figure, for example using springs, which are fitted in segmented fashion over three connections. A housing seal 31 is also necessary here. The fastening may be performed by calking of the motor flange with the HCU or ECU at 25, see the upper image half 28. The "pump with pump housing" version is illustrated here. The motor is illustrated here as a brushless motor, which requires a motor sensor for commutation and control of the volumetric delivery rate of the pump. This motor sensor is arranged remote from the drive housing 22, wherein a sensor shaft 26, which is arranged or fastened on the drive shaft 1, bears a sensor target 27. This target 27 acts on the sensor element 28, which is arranged on the printed circuit board of the ECU. The winding is connected via contact rails 24 to the ECU.

The motor with bearing flange 18 may be connected directly to the hydraulics housing HCU, which contains valves or other hydraulic components, with the pump. If this is not the case, then a connection of the drive housing 22, 18 directly to the housing of the ECU is expedient.

It is likewise possible for the gear pump Z to be arranged in a pump housing 40 which is connected directly to the hydraulics housing HCU, as illustrated in FIG. 5 in the upper half of the drive shaft 1. Before the assembly of the pump housing 40 and hydraulics housing HCU, or pump housing 40 and ECU, the gear pump Z is firstly integrated or installed in the pump housing 40, wherein the rotor 21 is subsequently pressed onto the shaft 1 and then assembled with the bearing 20. Here, the tensile force of the magnet 30 may additionally act on the rotor 21 and the bearing 20, such that the bearing acts in the manner of a four-point bearing. The motor housing 22 is thus connected to the gear pump Z and its pump housing 40 and can be connected to the hydraulics housing HCU or the electronics housing ECU in the next step. The fastening screw 41 is used for this. The shaft 1 is firstly centered in the outer disks 7.1 and 7.2, such that the pump housing 40 is centered with the shaft 1 before being screwed to the hydraulics housing HCU or the electronics housing ECU.

The pressure supply device as per FIG. 6a uses a 2-stage pump with a long slide or rolling bearing arrangement as per FIGS. 2 and 4, which does not require a separate motor bearing arrangement. Accordingly, the motor construction with housing is simplified. The rotor 21 is seated with the driver 10a on the motor shaft, and is connected axially by means of the securing ring. Here, the pump housing protrudes slightly into the HCU.

FIG. 7a shows pressure build-up control with PPC control and with additional PWM control of a solenoid valve that connects the pressure supply to the hydraulic consumers, in this case for the rear axle and front axle.

The pressure build-up at the front axle is performed through precise admission pressure control using the PPC method with a pressure signal as a controlled variable or using current i, temperature T and angular position E. Here, the solenoid valve is constantly open. In this way, the admission pressure can be very precisely controlled in terms of its profile with respect to time, and the pressure $p_{VA}$ at the front axle can be set. The precise pressure control and the pressure profile with respect to time are particularly important for very precise coordination with the braking torque of the electric traction motor TM. At the same time, the rear axle is controlled in terms of the pressure profile by way of the admission pressure of the pressure supply $p_{DV1}$ and opening cross section of the solenoid valve by way of PWM control or current control of the ball seat valve. The different pressure profiles are used to simultaneously vary the pressure profiles at the axles (EBV function) or to optimally control the recuperation of one traction motor at one axle or recuperation with 2 traction motors at 2 axles which generate different braking torques.

FIG. 7b shows pressure reduction control with PPC control and with additional PWM control of a valve that connects the pressure supply DV1 to VA. The pressure reduction control follows the same logic as the pressure build-up control in FIG. 7a, with the difference that the axle that is operated at a higher pressure requires a smaller opening cross section. In this case, the solenoid valve at the front axle is PWM-controlled or current-controlled.

FIG. 7c in turn shows multiplex control (MUX control) with which the brake pressure in the two brake circuits can be varied individually in alternation, that is to say in succession in small steps, or else simultaneously. Here, the pressure is regulated in succession, leading to a time delay ΔtMux, which is however so small that there is little or no functional limitation. So as not to make this noticeable to the driver, either the pressure control must be performed very quickly in succession, or the torque control of the traction motors must be adapted. Alternatively, the MUX control can also be performed simultaneously or partially simultaneously, as is known from the prior art. This leads to somewhat higher noise, which is however considered non-critical in driving operating states where this is necessary, with a deceleration of 1 g.

FIGS. 8a to 9b show different possible modular designs, that is to say arrangements of the individual components of the brake system according to the invention with respect to one another, for different embodiments of the brake system.

Figure 8A:
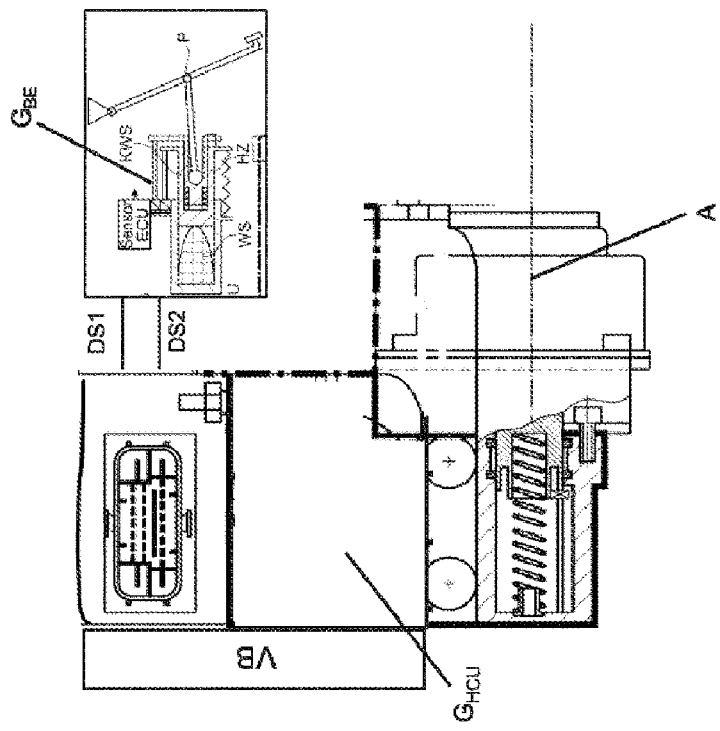
Figure 8B:
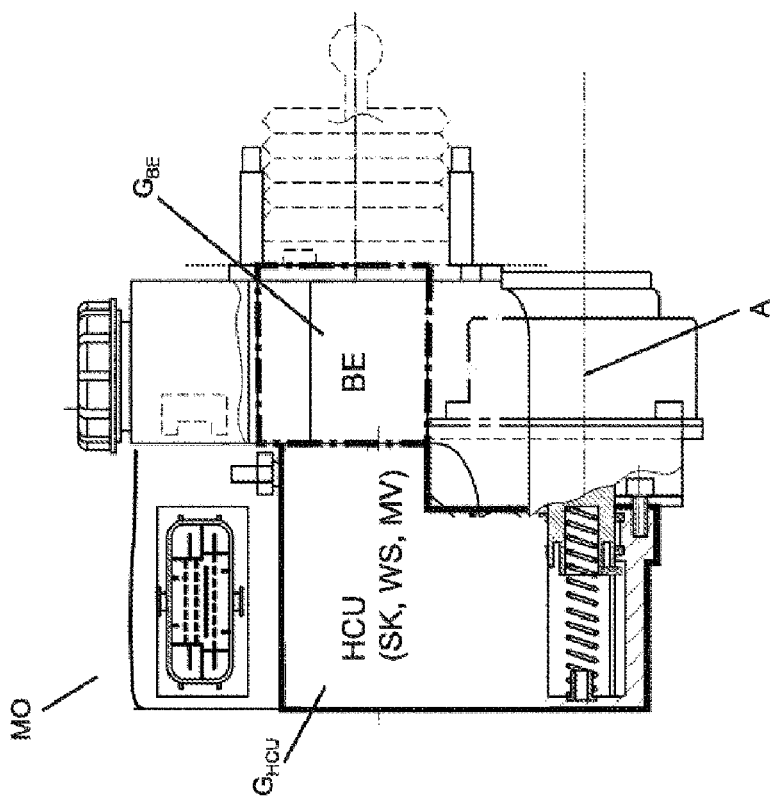

FIG. 8a shows a first possible embodiment of the brake system according to the invention as a module or structural unit M0, wherein the valve unit HCU and the actuating unit BE are arranged in separate housings $G_{HCU}$ and $G_{BE}$ which are either situated adjacent to one another or, as illustrated in FIG. 8b, arranged separately from one another. The motor axis of the drive of the pressure supply device, or, if present, the axis A of the piston-cylinder unit of the pressure supply DV, is oriented parallel to the axis of the piston-cylinder unit of the actuating unit BE. This construction may be used in particular for the embodiments of the brake system as per FIGS. 1b and 4. The valve arrangement HCU may comprise all solenoid valves, pressure transducers DG and/or pistons, in particular floating pistons, of the pressure supply DV. The travel simulator WS may be either entirely or partially in the housing $G_{BE}$ of the actuating unit BE or the housing $G_{HCU}$ of the valve arrangement HCU. This construction is expedient with regard to a very inexpensive manufacturing process for the hydraulic block of the valve arrangement HCU, wherein the manufacturing process can utilize the extrusion technology of modern ESP/ABS systems.

Owing to the arrangement of valve arrangement and actuating unit in separate housings, the actuating unit can be removed from the module or the structural unit and can be separated therefrom.

FIG. 8b shows the arrangement as per FIG. 8a, wherein the brake system however has an electric pedal, which is a part of the actuating unit BE arranged separately from the structural unit or module MO. The actuating unit BE is connected to the module MO via data and signal lines DS1, DS2. There is no hydraulic connection.

Figures 9A, 9B:
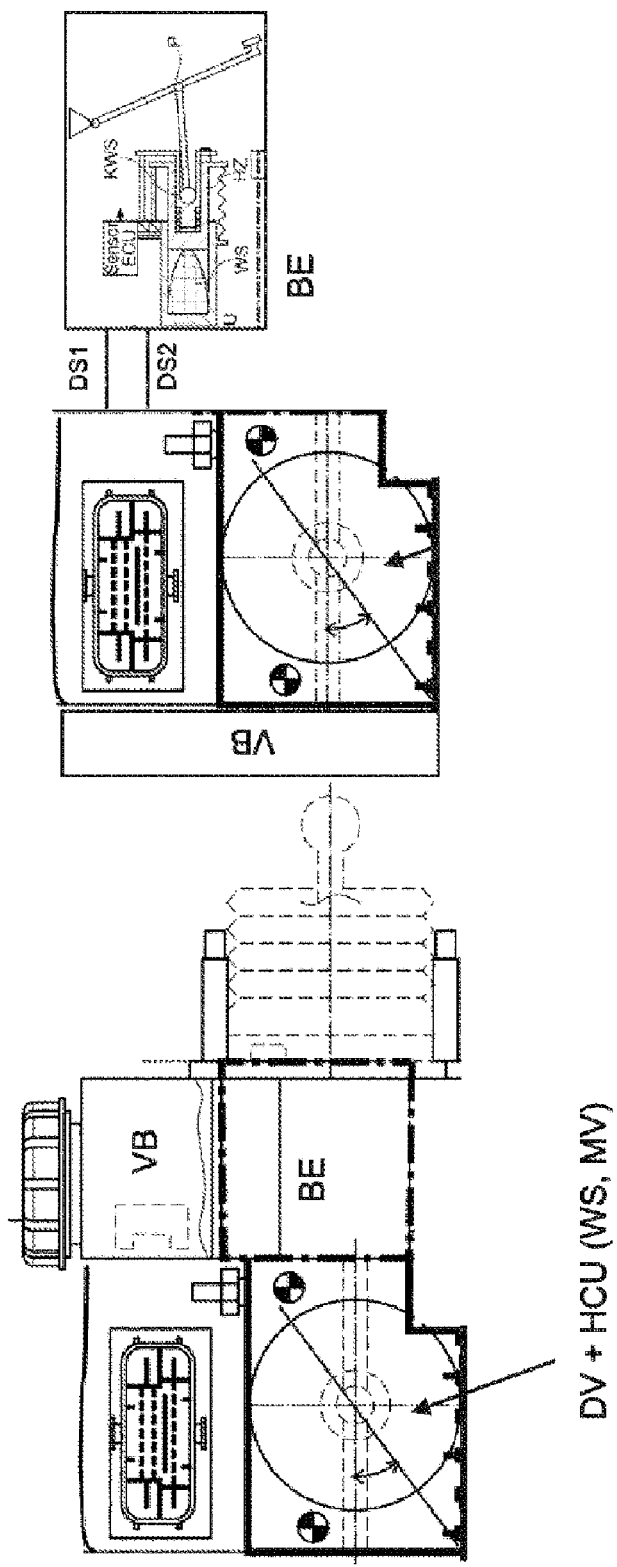

FIGS. 9a and 9b show modules or structural units MO similar to those illustrated and described in FIGS. 8a and 8b, with the difference that the pressure supply DV has a rotary pump ZRP instead of a piston-cylinder unit. In the embodiment of FIG. 9a, the axis of the motor driving the rotary pump is oriented or arranged transversely with respect to the axis of the piston-cylinder unit of the actuating device BE. Here, the brake system may be configured as per FIG. 2c. The configuration of the rotary pump ZRP may be selected as illustrated in FIG. 6a or 6b. The hydraulics may in this case be configured as described in FIG. 3. This then leads to the structural unit 10b with separate electric pedal.

FIG. 10 shows the brake system for a two-wheeled vehicle, in which the vehicle has only one wheel per axle. The wheel brakes RB1 and RB2 are each assigned to a brake circuit BK1 and BK2, to which a supply is provided by means of the pressure supply unit DV1, preferably in the form of an inexpensive rotary pump, via the switching valves $SV_{A1}$ and $SV_{A2}$. Otherwise, the construction of the brake system corresponds to that of FIG. 1. Alternatively and preferably, for two-wheeled vehicles, in particular relatively low-powered electric scooters or electric pedelecs with relatively low top speeds, the relatively inexpensive hydraulic circuit shown in FIG. 2c, with fewer valves and an actuating unit with a single-circuit infeed via the actuating unit BE into the front-wheel brake, may be implemented, wherein the rear wheel is driven and decelerated by means of only one electric traction motor.

What is claimed is:

1. A driving dynamics system comprising:
a first axle and a second axle, each including one or more wheels;
at least one electric traction motor for driving and braking at least one of the wheels, wherein energy is enabled to be recovered by means of the traction motor during braking;
hydraulic wheel brakes arranged to brake respective ones of the wheels;
a pressure supply device with pressure supply, comprising a piston-cylinder unit with a piston driven by an electric motor or a rotary pump, wherein the pressure supply is designed to both build up pressure and to reduce pressure;
a central software module configured for a brake management that controls the at least one electric traction motor and the pressure supply device such that, by the interaction of the pressure supply device and the at least one electric traction motor, a braking deceleration is set by closed-loop control individually for each axle and/or each wheel brake, so that with simultaneous recuperation, electric braking force distribution is implemented between the first and the second axle;
a first brake circuit connected with the pressure supply by a first connection line to facilitate supplying pressure;
at least one first switching valve arranged to selectively close and open the first connection line;
a second brake circuit connected with the pressure supply by a second connection line to facilitate supplying pressure; and
at least one second switching valve arranged to selectively close and open the second connection line;
wherein the pressure supply is adapted to perform a pre-pressure control, in which a first pressure is set in the first brake circuit using the at least one first switching valve opened, and wherein a second pressure is set in the second brake circuit simultaneously or semi-simultaneously.

2. The driving dynamics system as claimed in claim 1, further comprising a first housing and a second housing, wherein the pressure supply device is disposed in the first housing, and wherein an actuating unit, comprising an electric pedal or a hydraulic actuating unit with a brake pedal and a travel simulator, is disposed in the second housing.

3. The driving dynamics system as claimed in claim 2, wherein the pressure supply device comprises two further connections, which serve for connection to the actuating unit, and wherein, by means of a build-up of pressure by the pressure supply device, a diagnosis of the actuating unit is performed in an event of failure of seals of pistons of the actuating unit.

4. The driving dynamics system as claimed in claim 2, wherein a braking force at the axles is generated by interaction of pressure of the pressure supply device and/or of the actuating unit with a braking torque of the at least one electric traction motor, wherein an open-loop and closed-loop control device is provided to control the pressure supply device and/or the actuating unit, along with the at least one electric traction motor, such that a braking deceleration at vehicle speeds <120 kph is implemented more than ⅔ by means of one or more of the at least one electric traction motor, to enable kinetic energy of the vehicle to be converted into electrical energy and stored.

5. The driving dynamics system as claimed in claim 1, wherein driving dynamics control actuators are provided for brakes, steering, and damping in order to optimize driving dynamics.

6. The driving dynamics system as claimed in claim 1, further comprising one or two open-loop and closed-loop control device(s) provided for the pressure supply device and/or at least one open-loop and closed-loop control device provided for the at least one traction motor, which open-loop and closed-loop control device(s) communicates or communicate bidirectionally via redundant signal lines with a superordinate open-loop and closed-loop control device and/or communicate with one another.

7. The driving dynamics system as claimed in claim 1, wherein a pressure is reduced and/or built up by means of the pressure supply by forward and backward movement of the piston of the pressure supply, wherein pressure is transmitted via the first connection line via the first switching valve to the first brake circuit and via a floating piston and the second switching valve into the second brake circuit, wherein the first and second switching valves are of normally-open design, whereby a previously implemented brake-circuit-specific simultaneous or partially simultaneous pressure profile control is realized by way of piston pressure control (PPC) of the piston of the pressure supply, supplemented by pulse-width modulation (PWM) control or current control of at least one of the first or second switching valves.

8. The driving dynamics system as claimed in claim 1, wherein the first and second switching valves are of normally-open design.

9. The driving dynamics system as claimed in claim 1, wherein an anti-lock braking/electronic stability control (ABS/ESP) unit is interconnected between the pressure supply device and the first and second brake circuits, wherein the ABS/ESP unit is connected by way of its inlets to the first and second connecting lines.

10. A driverless vehicle comprising the driving dynamics system as claimed in claim 1, wherein the driving dynamics system is operated purely in an autonomous driving (AD-Ctrl) operation.

11. A racing vehicle comprising the driving dynamics system as claimed in claim 1, wherein dynamic axle-specific braking torque control is performed in the context of electronic brake force distribution (EBV) optimization and simultaneous recuperation by means of the at least one electric traction motor at one or two of the axles.

12. An electric vehicle comprising the driving dynamics system as claimed in claim 1.

13. The driving dynamics system as claimed in claim 1, wherein the first pressure is larger than the second pressure.

* * * * *